(12) United States Patent
Greenebaum et al.

(10) Patent No.: US 11,385,781 B2
(45) Date of Patent: Jul. 12, 2022

(54) MULTI-DISPLAY ALIGNMENT THROUGH OBSERVED INTERACTIONS

(71) Applicant: Apple Inc., Cupertino, CA (US)

(72) Inventors: Kenneth I. Greenebaum, San Carlos, CA (US); Ian C. Hendry, San Jose, CA (US); John C. Gnaegy, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 57 days.

(21) Appl. No.: 17/031,473

(22) Filed: Sep. 24, 2020

(65) Prior Publication Data

US 2021/0096730 A1    Apr. 1, 2021

Related U.S. Application Data

(60) Provisional application No. 62/907,197, filed on Sep. 27, 2019.

(51) Int. Cl.
*G06F 3/0484* (2022.01)
*G06F 3/14* (2006.01)
*G09G 5/00* (2006.01)
*G06F 3/04842* (2022.01)

(52) U.S. Cl.
CPC ........ *G06F 3/04842* (2013.01); *G06F 3/1407* (2013.01); *G06F 3/1423* (2013.01); *G09G 5/003* (2013.01); *G06F 2203/04803* (2013.01); *G09G 2354/00* (2013.01); *G09G 2360/18* (2013.01)

(58) Field of Classification Search
CPC ......... G06F 2203/04803; G06F 3/1423; G06F 3/1407; G06F 33/04842; G09G 2354/00; G09G 2360/18; G09G 5/003
See application file for complete search history.

(56) References Cited

U.S. PATENT DOCUMENTS

| 10,705,781 | B1 * | 7/2020 | Guo ....................... G09G 5/005 |
| 2015/0062129 | A1 * | 3/2015 | Wilensky .............. G06T 11/203 |
| | | | 345/442 |
| 2015/0205561 | A1 * | 7/2015 | Morton ................. G06F 3/1446 |
| | | | 345/1.3 |

(Continued)

FOREIGN PATENT DOCUMENTS

WO    WO-2011022014 A1 *  2/2011  .......... G06F 3/1446

*Primary Examiner* — Sang H Kim
(74) *Attorney, Agent, or Firm* — Invoke

(57) ABSTRACT

In some implementations, a computing device can perform multi-display alignment through observed user interactions. The computing device can receive user input aligning a first alignment object on a first display device with a second alignment object on a second display device. The computing device can align the display buffers for each display device based on the positions of the alignment objects in each display buffer corresponding to each display device. The computing device can align display buffers based on observed movements of graphical objects between multiple display devices. When display buffers corresponding to the display devices are misaligned, the user may correct the path of a graphical object when moving the graphical object between display devices. The computing device can detect the correction and align the display buffers of the display devices so that graphical objects are presented at the appropriate locations when moved between the display devices.

20 Claims, 14 Drawing Sheets

(56) References Cited

U.S. PATENT DOCUMENTS

2015/0268917 A1* 9/2015 Leppanen ............. G06F 3/1438
  345/1.3
2018/0107358 A1* 4/2018 Chodakowski ....... G06F 3/1423

* cited by examiner

MULTI-DISPLAY ALIGNMENT THROUGH OBSERVED INTERACTIONS

RELATED APPLICATIONS

This application claims the benefit of the filing date of U.S. Provisional Patent Application No. 62/907,197 filed on Sep. 27, 2019, which is hereby incorporated by reference.

TECHNICAL FIELD

The disclosure generally relates to aligning multiple displays in multiple display systems.

BACKGROUND

Often users of computing devices will have multiple display devices connected to their computing devices. For example, a user who works on a mobile computer (e.g., laptop computer, tablet computer, etc.) having a small display will often connect to a larger external display, additionally it is increasingly common for a portable device such as a mobile tablet computer to be used as an additional display for another system (such as Apple's Sidecar feature for iPads to be used with Mac desktop or Laptops). A user who works from a desktop computer may connect the desktop computer to multiple external displays. These additional displays may be connected via a cable or wirelessly, and, being hand held, their physical position, and thus expected logical arrangement with the other displays might change dynamically. This additional display area makes using the computing device much easier and more efficient when simultaneously working with multiple documents and/or multiple software applications on the computing device.

When connecting a second or subsequent display device to a computing device that is already connected to a first display device, the user will often be required to explicitly configure the physical arrangement of the multiple display devices relative to each other so that when the user moves a cursor, window, or other graphical object, from one display device to another, or leaves an object spanning across multiple displays, the object moves smoothly and continuously from display to display as expected (e.g., the object moves as if it were a physical object leaving one edge of one display and appearing on the physically adjacent display along the path of the cursor movement at the expected location on the destination display device) and/or the spanning object is aligned as expected across the multiple displays. In one of the typical ways of configuring the relative positions and/or alignment of multiple displays in a multiple display system, the computing device can present on one of the display devices graphical representations of the multiple display devices connected to the computing device. The user can then provide input to arrange the graphical representations of the display devices such that the representations mimic the physical alignment and/or relative positions of the actual, physical display devices. The computing device can then use the arrangement of the graphical representations of the display devices to determine how to align the display buffers for the display devices and/or how move a cursor from one display to another.

SUMMARY

In some implementations, a computing device can perform multi-display alignment through observed user interactions. The computing device can receive user input aligning a first alignment object on a first display device with a second alignment object on a second display device. With knowledge of the displays' characteristics such as resolution, pixels density, physical size, height of display off table surface, the computing device can use the observed interaction data to solve for and align the display buffers for each display device based on the positions of the alignment objects in each display buffer corresponding to each display device. The alignment itself may consist of scaling, rotation, and translation operations providing a transformation from a large, continuous, virtual rendering space to the pixels in the individual displays. Alternately the alignment might be used to translate the cursor and other graphical objects from display to display in a physically analogous manner without requiring a continuous extended desktop to exist.

In some implementations, the computing device can align display buffers based on observed movements of the use attempting to move graphical objects between multiple display devices. When the user intends to move an object from one display to another, they will naturally drag the object in the direction of where they want to place it on the second display thus providing valuable information regarding the physical relationship between the displays otherwise unknown to the system. When display buffers corresponding to the display devices are misaligned, the object may leave the first display where the user dragged it, but the system may cause the object to emerge on the second display in a location different from where the user anticipated potentially causing the user to correct the path of the graphical so as to reach the intended target on the new display. The computing device can detect the correction, as a deviation in trajectory after the object transferred to the second display from the user's initial arc on the first display, and align the display buffers of the display devices so that graphical objects are presented at the appropriate locations when moved between the display devices.

Particular implementations provide at least the following advantages. Multiple display devices (e.g., the display buffers thereof) can be more accurately or precisely aligned thereby improving the user experience when interacting across multiple displays. Multiple display devices can be dynamically aligned without requiring the user to perform a specific or explicit alignment process or interaction. Display alignments can be refined over time by analyzing multiple user interactions across multiple display devices. Changes in display alignment due to display angle, laptop positioning, the user's position, or other changes, can be dynamically detected and alignment adjustments made without the user having to perform a prescribed alignment interaction or input. By dynamically monitoring interaction, re-solving for position, aligning the display buffers, and cursor/object transformations in a multiple display system, the system can improve the user experience by presenting graphical objects at user expected locations when moving graphical objects across multiple display devices.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

The disclosure generally relates to aligning multiple displays in multiple display systems into a common extended desktop space, or independent spaces, both potentially transferring the cursor from display to display based on the display's physical size and location so that the cursor logically and visually continuously tracks movement jumping from display to display according to the physical location (similar to a user pointing a laser pointer directly at the display). However, to achieve this, many pieces of precision information are required including: the number of pixels on the display, the special pixel density (might be asymmetric too), the height of the display off the desktop, the physical location and orientation of the displays. While there exist primitive mechanisms for users to describe the display arrangement relationships to the system, they are cumbersome and imprecise leading to less than optimal results which then deteriorate as the physical positioning changes over time without the user fine-tuning the arrangement process. This disclosure describes a mechanism to automatically glean and fine tune these relationships by observing how the user interacts with the system.

Figure 1:
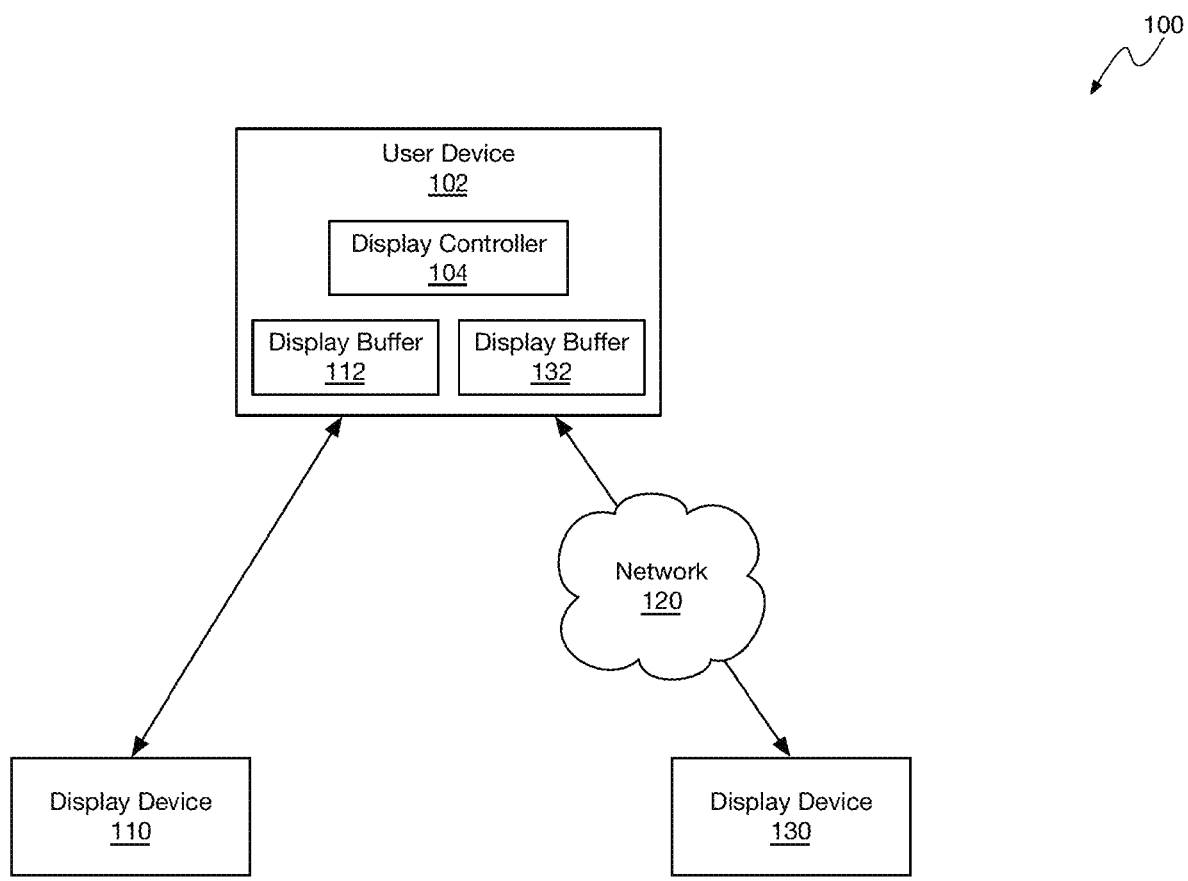
FIG. 1 is a block diagram of an example system for multi-display alignment through observed user interactions.

FIG. 1 is a block diagram of an example system 100 for multi-display alignment through observed user interactions. In some implementations, system 100 can include user device 102. For example, user device 102 can be a computing device, such as a desktop computer, laptop computer, tablet computer, laptop computer, smartphone, smartwatch, wearable device, or any other type of computing device.

In some implementations, system 100 can include display device 110. For example, display device 110 can be a physical display device connected to user device 102. Display device 110 can be integral to user device 102, such as a built-in display of a laptop computer, smartphone, tablet computer, etc. Display device 110 can be an external display connected to user device 102 by a physical connection, such as a video cable that connects a monitor to a desktop computer. Display device 110 can be the primary display device for user device 102, for example.

In some implementations, system 100 can include display device 130. For example, display device 130 can be an external display device, such as an external monitor, television, projector, augmented reality display, virtual reality display, headset display, smart glasses, smart watch, or other display device. Display device 130 can be connected to user device 102 through network 120. For example, network 120 can be a wired (e.g., ethernet) or wireless (e.g., Wi-Fi, Bluetooth, peer-to-peer, etc.) network. Network 120 can represent a direct cable connection between user device 102 and display device 130. Thus, display device 130 can be connected to user device 102 through a wired or wireless connection.

In some implementations, user device 102 can include display controller 104. For example, display controller 104 can manage the presentation of data, graphics, etc., on one or more connected display devices (e.g., display device 110, display device 130, etc.) connected to user device 102. Display controller 104 can manage a display buffer (e.g., frame buffer, screen buffer, video buffer, etc.) for each display device connected to user device 102. When presenting video (e.g., including graphical objects, graphical user interfaces, etc.), user device 102 and/or display controller 104 can store data (e.g., a bit map, a pixel map, etc.) defining a video frame to be presented on a display device in the display buffer corresponding to the display device. Frames of video can be generated based on the data in the display buffer and sent to the corresponding display device for presentation, according to well-known mechanisms. For example, display controller 104 can manage display buffer 112 for display device 110. Display controller 104 can manage display buffer 132 for display device 130. Each display buffer can be configured according to the specifications of the corresponding display device. For example, display buffer 112 can be configured based on the display capabilities, resolution, screen size, pixel dimensions, etc., of display device 110. Display buffer 132 can be configured based on the display capabilities, resolution, screen size, pixel dimensions, etc., of display device 130.

When user device 102 (e.g., the operating system, an application, etc.) presents a graphical element (e.g., graphical user interface, text, images, icons, cursor, etc.) on a display, user device 102 can write the graphical element to the appropriate location (e.g., horizontal, vertical pixel location) in the appropriate display buffer. The data in the display buffer can then be sent to the corresponding display device for presentation to the user. By changing the location (x,y pixel location) of the graphical element over time, user device 102 can cause the graphical element to be animated on the corresponding display device. Thus, when a user provides input to move a graphical object (e.g., cursor, alignment object, window, etc.), user device 102 and/or display controller 104 can, in response to the input, change the location of the graphical object in the display buffer according to the user input.

When multiple displays are connected to user device 102, the user may wish to move a cursor and/or other graphical object (e.g., application window, folder, etc.) between the displays. To enable a smooth transition between display devices 110 and display device 130, display buffer 112 and display buffer 132 can be associated with display alignment data that describes how display buffer 112 and display buffer 132 should be positioned (e.g., left/right, above/below) and/or aligned (e.g., horizontal offset, vertical offset, spacing between displays, etc.) with respect to each other. When configured correctly, this alignment data should correspond to, or represent, how the physical display devices 110 and display device 130 are positioned with respect to each other in the real-world environment.

In some implementations, user device 102 can be configured with default alignment data (e.g., including display specifications, typical positioning, typical alignment, etc.) for various models of display devices that may be connected to user device 102. When user device 102 connects to a display device (e.g., display device 120, display device 130, etc.), user device 102 can receive model identification information from the display device and use the model identification information to obtain default alignment data for the connected display device.

The default alignment data for each display device (e.g., display device 110, display device 130, etc.) can indicate the display dimensions (e.g., 8 inches wide×8.94 inches high), the native resolution (e.g., 2560-by-1600 pixels native resolution), the pixel density (e.g., 227 pixels per inch), the size of the bezels (ie the distance between the addressable display and the physical edge of the enclosure, the default spacing relative to other displays (e.g., 2 inches with the displays displays almost physically touching), the default horizontal or vertical alignment offset relative to other displays or relative to a surface upon which the display is sitting (e.g., 3 inches off the resting surface), and/or a default directional position relative to other displays (e.g., above, below, right, left). For example, the default alignment data for display device 110 may indicate that display device 110 is an integral display of a laptop computer that is 9×8 inches, 227 pixels per inch, 3 inches off the resting surface, and should be positioned to the right of other displays. The default alignment data for display device 130 may indicate that display device 130 is a standalone display that is 18×10 inches, 180 pixels per inch, and 5 inches off the resting surface. Based on this default alignment data, display controller 104 can determine the relative positions of display device 110 and display device 130 and their relative alignment (e.g., display device 110 is to the right of display device 130 and has a −50 pixel vertical offset).

Figure 2:
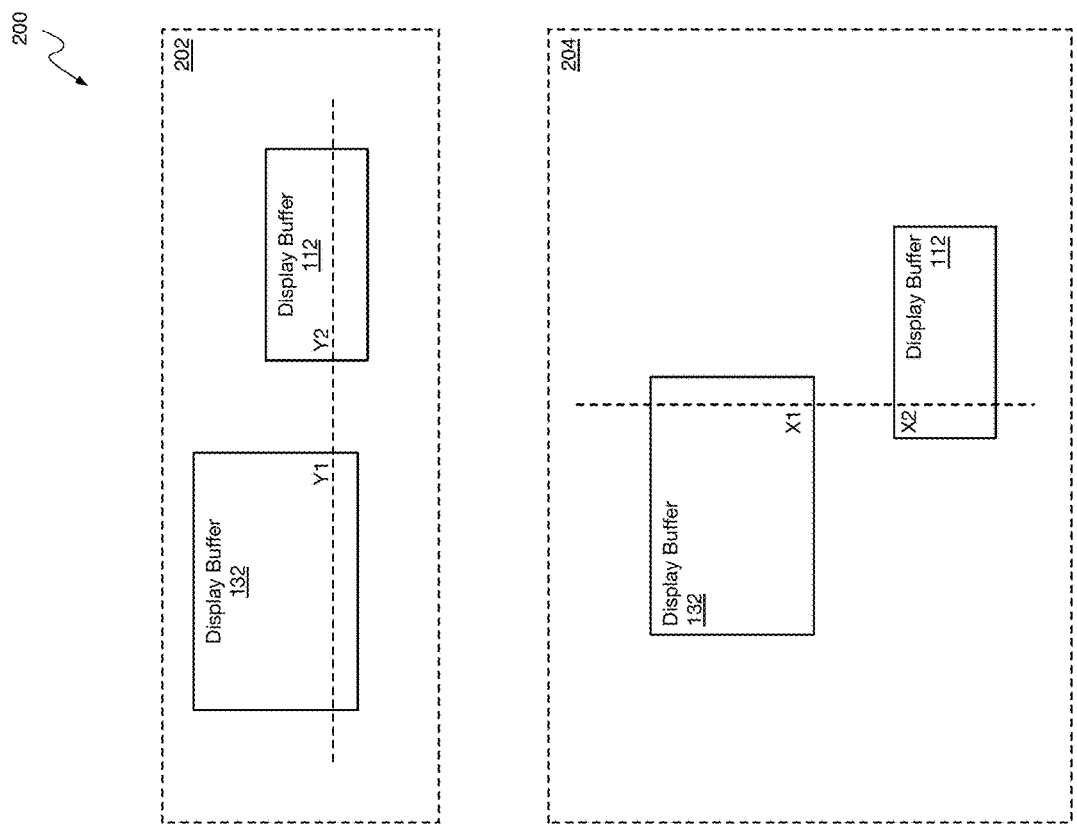
FIG. 2 is a diagram illustrating aligning display buffers for multiple display devices.

FIG. 2 is a diagram 200 illustrating aligning display buffers for multiple display devices. As described above, display controller 104 can determine the relative positions of display buffer 112 and display buffer 132 based on default alignment data. Continuing the example above and represented by configuration 202 in diagram 200, display controller 104 can determine that the left edge of display buffer 112 is proximate to (e.g., but spaced apart from) the right edge of display buffer 132 because the alignment data for display device 110 indicates that display device 110 should be positioned to the right of display device 130. Display controller 104 can determine the relative vertical alignment of display buffer 112 and display buffer 132 based on default alignment data. For example, based on the display dimensions, resolution, and/or pixel density data in the default alignment data for display device 110 and display device 130, display controller 104 can determine the relative vertical alignment display buffer 112 and display buffer 132. For example, display controller can determine that a specific row of pixels (Y2) in display buffer 112 aligns with (e.g., is at the same height as) a specific row of pixels (Y1) in display buffer 132. Thus, if Y1 is 50 and Y2 is 100, the vertical offset value between display buffer 132 and display buffer 112 is 50. For example, when moving graphical objects from display buffer 112 to display buffer 132, display controller 104 can subtract 50 from the pixel row index of the location of the graphical object when it leaves display buffer 112 to determine the pixel row placement of the graphical object when it enters display buffer 1321. When moving graphical objects from display buffer 132 to display buffer 112, display controller 104 can add 50 to the pixel row index of the location of the graphical object when it leaves display buffer 132 to determine the pixel row placement of the graphical object when it enters display buffer 112.

In other configurations (not shown), display controller 104 may determine that display buffer 112 is to the left of display buffer 132 and determine corresponding rows of pixels (e.g., Y1, Y2) in display buffer 112 and display buffer 132 that align display buffer 112 and display buffer 132 vertically. Display controller 104 can then determine the appropriate vertical offset for moving graphical objects between display buffers (e.g., display devices). For example, display controller 104 can apply the appropriate vertical offset to determine where the graphical object should appear when moved from one display to another.

In yet other configurations (e.g., configuration 204), display controller 104 may determine that display buffer 112 should be placed below (or above) display buffer 132 and determine corresponding columns of pixels (e.g., X1, X2) in display buffer 112 and display buffer 132 that align display buffer 112 and display buffer 132 horizontally. Display controller 104 can then determine the appropriate horizontal offset for moving graphical objects between display buffers (e.g., display devices). For example, display controller 104 can apply the appropriate horizontal offset to determine where the graphical object should appear when moved from one display to another.

As described above, after determining the relative positions of each of the display devices and/or display buffers in a multiple display system based on the default alignment data, display controller 104 can determine a horizontal and/or vertical alignment offset values for the display buffers that can be used to determine where to present graphical objects (e.g., cursor, windows, etc.) that are moved between display devices. For example, with reference to configuration 202 in diagram 200, Y1 may correspond to pixel row 1000 of display buffer 132 while Y2 may correspond to pixel row 800 of display buffer 112. Thus, display controller 104 may determine a vertical alignment offset of −200 for transitioning, or moving graphical objects, from display buffer 132 (e.g., display device 132) to display buffer 112 (e.g., display device 110). For example, when moving a cursor from pixel row 900 of display buffer 132 to display buffer 112, display controller 104 can determine where to place the cursor in display buffer 112 by subtracting 200 from 900 and placing the cursor at pixel row 700 at the left edge of display buffer 112. When moving the cursor from display buffer 112 to display buffer 132 the negative of the vertical alignment offset can be used to determine where to place the cursor in display buffer 132.

As another example, with reference to configuration 204 in diagram 200, X1 may correspond to pixel column 1200 of display buffer 132 while X2 may correspond to pixel column 200 of display buffer 112. Thus, display controller 104 may determine a horizontal alignment offset of −1000 for transitioning, or moving graphical objects, from display buffer 132 to display buffer 112. For example, when moving a cursor from pixel column 1100 of display buffer 132 to display buffer 112, display controller 104 can determine where to place the cursor in display buffer 112 by subtracting 1000 from 1100 and placing the cursor at pixel column 100 at the top edge of display buffer 112. When moving the cursor from display buffer 112 to display buffer 132 the negative of the horizontal alignment offset can be used to determine where to place the cursor in display buffer 132.

After determining the relative horizontal (e.g., right/left) or vertical (top/bottom) position of display buffer 112 and display buffer 132, display controller 104 can align display buffer 112 with display buffer 132 according to the determined relative horizontal alignment offset and vertical alignment offset determined for display buffer 112 and display buffer 132. For example, with respect to configuration 202, display controller 104 can align display buffer 112 to the right of display buffer 132 and adjust the vertical alignment according to the determined vertical offset such that pixel row Y1 of display buffer 132 is aligned with pixel row Y2 of display buffer 112. Thus, when the user moves the cursor (or other graphical object) from display device 130 (e.g., display buffer 132) off the right edge of display device 130 at pixel row Y1, the cursor will appear on display device 110 at the left edge of display device 110 (e.g., display buffer 112) at pixel row Y2. Thus, if the default alignment data correctly corresponds to the actual, physical, relative alignment of display device 110 and display device 130, the cursor will appear in the appropriate (e.g., user expected) location when moved from one display device to another based on the logical physical relationship of the displays, as observed by the user.

While the default alignment process is described above with reference to two display devices, a similar process can be performed to determine the relative placement of display buffers corresponding to three or more display devices to enable smooth transitions between multiple displays in a multiple display system.

However, in some cases, the default alignment data of display device 110 (e.g., display buffer 112) and display device 130 (e.g., display buffer 132) may not represent the real-world alignment or relative positions of the two display devices. Thus, user device 102 may be configured to cause the user of user device 102 to engage in a display alignment interaction to determine the actual, real-world relative positions of the display devices in a multiple display system.

Figure 3:
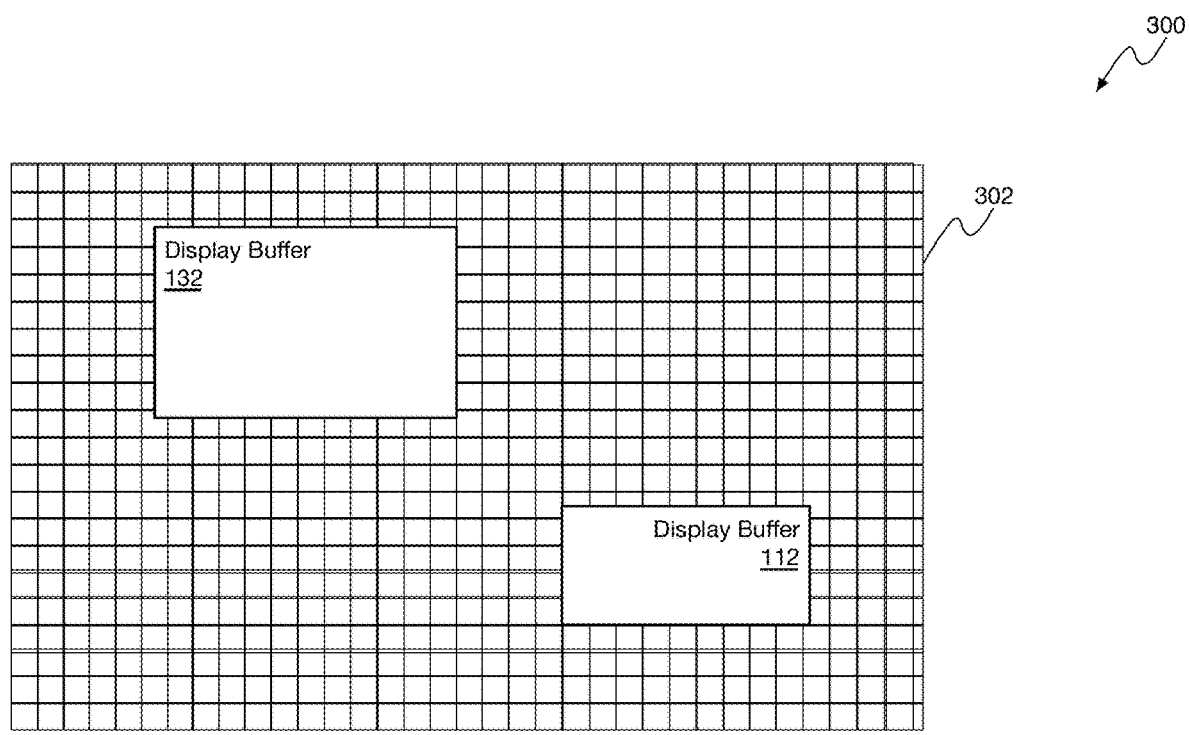
FIG. 3 is a diagram illustrating a display buffer alignment technique using a display alignment model.

FIG. 3 is a diagram 300 illustrating a display buffer alignment technique using a display alignment model. For example, the display alignment model can be a two-dimensional or three-dimensional model that represents the geometries and relative positions of the display devices (e.g., display device 110, display device 130) in space. As described above, user device 102 can have default alignment data associated with each display device (e.g., display device 110, display device 130, etc.) connected to user device 102. The default alignment data can be used by user device 102 to determine how to generate the display alignment model and align the display buffers (e.g., display buffer 112, display buffer 132, etc.) relative to each other in the model so that user device 102 can present graphical objects (e.g., cursors, windows, etc.) that are moved between display devices (e.g., between display buffers) at the locations where the user would expect the graphical objects to appear on the displays thereby providing smooth transition between displays. For example, the display alignment model can be used to align the display buffers for the display devices into a physically continuous and/or representative mathematical space, as described further below.

To achieve this display alignment goal (e.g., a smooth transition, presentation of graphical objects at expected locations, etc.), display controller 104 can generate the display alignment model using a normalized pixel transform buffer 302 (e.g., alignment buffer) to determine how to move graphical objects from one display to another. For example, the normalized pixel transform buffer 302 can define a pixel space that maps display buffers for the connected displays to pixel locations within the normalized pixel transform buffer 302 that represent the real world spacing and/or relative orientations of the connected displays as defined by the default alignment data described above or determined by the observed user interactions described below.

The pixel transform buffer 302 can include a pixel map (e.g., two-dimensional array of pixels, three-dimensional array of pixels, etc.) that is sized large enough to include the display buffers associated with each connected display and the relative spacing, orientations, positions, and/or alignments of the connected displays. The pixels of the pixel transform buffer 302 can be of a normalized size. For example, each of the displays connected to user device 102 may have different pixel sizes and/or pixel densities. Each of the pixels in the displays, or display buffers, can be mapped to a pixel, or multiple pixels, in the pixel transform buffer 302 so that an appropriate trajectory, curve, etc., can be determined for moving a graphical object from one display buffer to another using the normalized, consistent pixel size array. Moreover, each pixel in the pixel transform buffer can be mapped to real-world dimensions (e.g., lengths, sizes, distances, etc.) so that the display buffers can be appropriately spaced and the pixels within each display buffer can be mapped to appropriate corresponding pixels in the pixel transform buffer 302. For example, pixel transform buffer 302 can be used to scale, rotate, translate, warp, or otherwise adjust the alignment of display buffers to account for differences in location, size, curvature, etc., of the various display devices (e.g., including keystone correction in projected displays.

For example, if the alignment data (e.g., default or determined) for display device 110 indicates that display device 110 is 3 inches above the surface upon which it is resting, then display buffer 112 can be spaced the pixel equivalent of 3 inches from the bottom of pixel transform buffer 302 (e.g., pixel alignment buffer). Display buffer 112 can be mapped to appropriate pixels within pixel transform buffer 302 so that the size of display buffer 112 is appropriately represented. If the alignment data (e.g., default or determined) for display device 130 indicates that display device 130 is 10 inches above display device 110, then display buffer 132 can be spaced the pixel equivalent of 10 inches above display buffer 112 corresponding to display device 110 in pixel transform buffer 302. Display buffer 132 can be mapped to appropriate pixels within pixel transform buffer 302 so that the size of display device 130 (e.g., and display buffer 132) is appropriately represented. The alignment data for display device 110 and/or display device 130 may indicate that the horizontal spacing between display device 110 and display device 130 is 5 inches. Thus, display buffer 112 and display buffer 132 can be placed the pixel equivalent of 5 inches apart in pixel transform buffer 302. Thus, the current relative positions, alignment and spacing of display devices 110 and 132 can be represented using pixel transform buffer 302.

In some implementations, pixel alignment buffer 302 can be used to determine how to move graphical objects from one display buffer (e.g., and corresponding display device) to another display buffer. For example, the pixel transform buffer 302 can represent a two-dimensional (or three-dimensional) grid or graph that can be used to calculate the trajectory (e.g., arc, curve, path, etc.) of graphical objects as they are moved from one display buffer (e.g., display buffer 132) to another display buffer (e.g., display buffer 112), determine errors in the current relative alignments of the various display buffers corresponding to the displays connected to user device 102, and determine corrections in display buffer alignments, as described below. Based on the relative display buffer positions and alignments represented in the pixel alignment buffer 302, the trajectories, curves, and alignment corrections can be determined using not only the dimensions or specifications of the represented display devices but also using, or accounting for, the spacings (e.g., empty space) between display devices and/or display buffers and relative display device positions and alignments as represented in pixel transform buffer 302.

Figure 4:
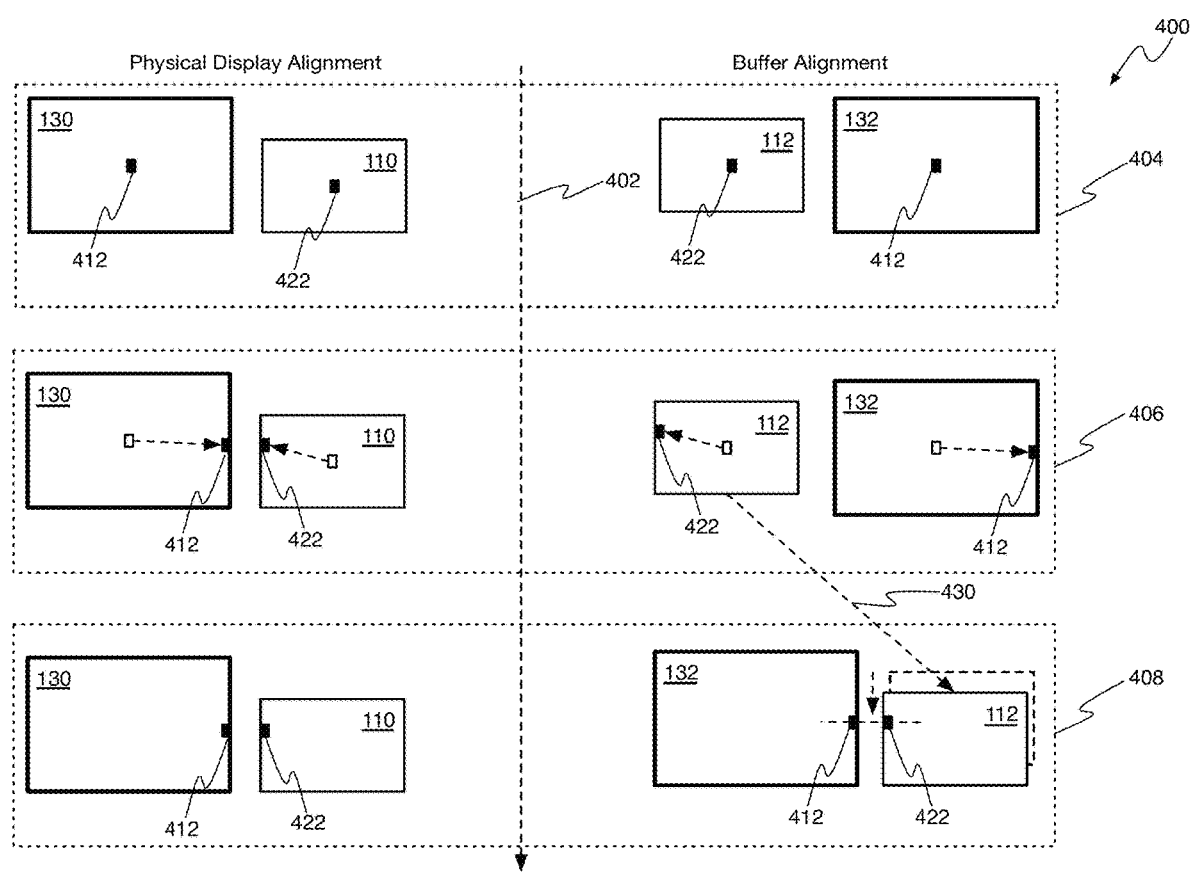
FIG. 4 is a diagram illustrating aligning display buffers based on a forced user interaction.

FIG. 4 is a diagram 400 illustrating aligning display buffers based on a forced user interaction. For example, in response to detecting a new display device 130 connected to user device 102 which is already connected to display device 110, display controller 104 can present graphical user interfaces on display devices 110 and 130 that prompt the user to manipulate an alignment object on each display device to indicate the proper physical alignment of each display device. The alignment data received through this user manipulation of the alignment objects can then be used to align the corresponding display buffers so that the appropriate or expected user experience can be achieved when moving graphical objects between display devices.

Diagram 400 depicts and/or contrasts the alignment of physical displays (left side of diagram) and display buffers (right side of diagram) in a sequence of stages 404-408 over time (indicated by arrow 402). Stage 404 represents an example initial alignment of physical displays 110 and 130 versus the alignment of the corresponding display buffers 112 and 132. The initial alignment can be determined and/or configured by user device 102 when a new display device (e.g., display device 130) is detected, for example. The initial alignment can be determined and/or configured by user device 102 based on a previous alignment or based on a default alignment of the display devices/display buffers. For example, user device 102 may receive user input initiating the display alignment procedure described below when the user rearranges the physical displays and needs to realign the display buffers to match the new arrangement of the display devices.

Since at stage 404 the buffer alignment may be based on the default alignment data or previous (e.g., old) alignment data, the alignment of display buffers 112 and 132 may not correspond to the actual relative positions and/or alignment of the physical display devices 110 and 130 as configured by the user. For example, at stage 404, although the physical display devices 110 and 130 are positioned with display device 130 to the left of display device 110 and aligned vertically at their bottom edges, corresponding display buffers 112 and 132 are positioned such that display buffer 132 (corresponding to display device 130) is positioned to the right of display buffer 112 (corresponding to display device 110) and centered vertically. Thus, because the display buffers 112/132 do not have an alignment that matches the real-world alignment of display devices 110/132, graphical objects that are moved between the display devices 110/132 may not appear in the appropriate locations on the display device to which the graphical objects are moved.

To allow the user to specify the alignment of the display devices 110/130, and correspondingly, the display buffers 112/132, display controller 104 may present graphical object 412 (e.g., alignment object) on display device 130 and graphical object 422 (e.g., alignment object) on display device 110. Since the data in display buffers 112/132 determines what is displayed on each respective display device 110/132, to display the graphical objects on display device 110 and display device 130, graphical object 422 must also be stored in display buffer 112 and graphical object 412 must be stored in display buffer 132.

At stage 406, the user can provide input to align the alignment objects on display devices 110 and 130. For example, the user can provide input, and user device 102 can receive the input, to move the alignment object (e.g., primary alignment object) on the primary display device nearer the alignment object (e.g., secondary alignment object) on the secondary (e.g., newly added) device until the primary alignment object is at the edge of the display device and aligned (e.g., vertically or horizontally) with the secondary alignment object on the secondary display device. While display controller 104 is moving the primary alignment object in the direction specified by the received user input, display controller 104 can move the secondary alignment object in the direction opposite of the user input so that each of the alignment objects move nearer to each other until aligned at the edge of their respective display devices.

As illustrated in the example of stage 406, when display device 110 is the primary display device and display device 130 is the secondary display device, the user can provide input to user device 102 to move graphical object 422 presented on display device 110 toward graphical object 412 presented on display device 130. As graphical object 422 is moved to the left toward display device 130 and graphical object 412, display controller 104 can move graphical object 412 to the right toward display device 110 and graphical object 422. The user can continue providing input to move graphical object 422 until graphical object 422 is at the left edge of display device 110 and aligned vertically with graphical object 412. Once aligned, the user can provide additional user input (e.g., a mouse click, a button press, etc.) indicating that graphical object 422 is aligned with graphical object 412. Display controller 104 can receive the user input indicating that the graphical objects are aligned, and determine the display location (e.g., pixel location) of graphical object 422 on display device 110 and determine the display location (e.g., pixel location) of graphical object 412 on display device 130.

During the above alignment interaction of stage 406 using display devices 110 and 130, graphical objects 422 and 412 are being moved in display buffers 112 and 132. Since display buffers 112 and 132 are not yet aligned correctly, the movement of graphical objects 412 and 422 may be used to realign the display buffers 112/132 to match the real-world alignment of the display devices 110/132. For example, graphical object 422 may move in display buffer 112 according to the alignment user input and correspondingly too how graphical object 422 moves on display device 110. However, since the display buffers 112/132 are not aligned correctly, graphical object 422 in display buffer 112 actually moves away from graphical object 412 and display buffer 132. Based on the direction of movement of graphical object 422 away from display buffer 132, display controller 104 can determine that display buffer 112 is positioned on the wrong side of display buffer 132 and rearrange the relative locations of the display buffers 112/132 such that display buffer 112 is positioned according to the direction of travel of graphical object 422. In the example of FIG. 4, display controller 104 can reposition display buffer 112 to the right of display buffer 132, as represented by dashed arrow 430.

Once the relative arrangement (e.g., top, bottom, left, right) of the display buffers is determined, display controller 104 can determine the relative alignment based on the final positions or locations of graphical objects 422 and 412 in display buffer 112 and 132, respectively. In the example, of FIG. 4, since display controller 104 has determined that display buffer 112 should be positioned to the right of display buffer 132 based on the user input, when the display controller 104 receives the additional user input specifying the final positions of graphical objects 422 and 412, display controller 104 can use the vertical positions (e.g., pixel row indexes) to align display buffers 112/132 vertically. If the display buffers were arranged above/below each other, then display controller 104 could use the horizontal positions (e.g., pixel column indexes) of graphical objects 422 and 412 to align display buffers 112/132 vertically. For example, at stage 408, display controller 104 can adjust the vertical position of display buffer 112 (or display buffer 132) such that the final locations of graphical objects 422 and 412 are horizontally aligned. In the example of stage 408, display controller 104 can move display buffer 112 downward relative to display buffer 132 such that graphical objects 422 and 412 are horizontally aligned. Thus, at the end of stage 408, the arrangement and/or alignment of display buffers 112/132 will correspond to, or match, the arrangement and/or alignment of the corresponding display devices 110/130 in the real world.

Figure 5:
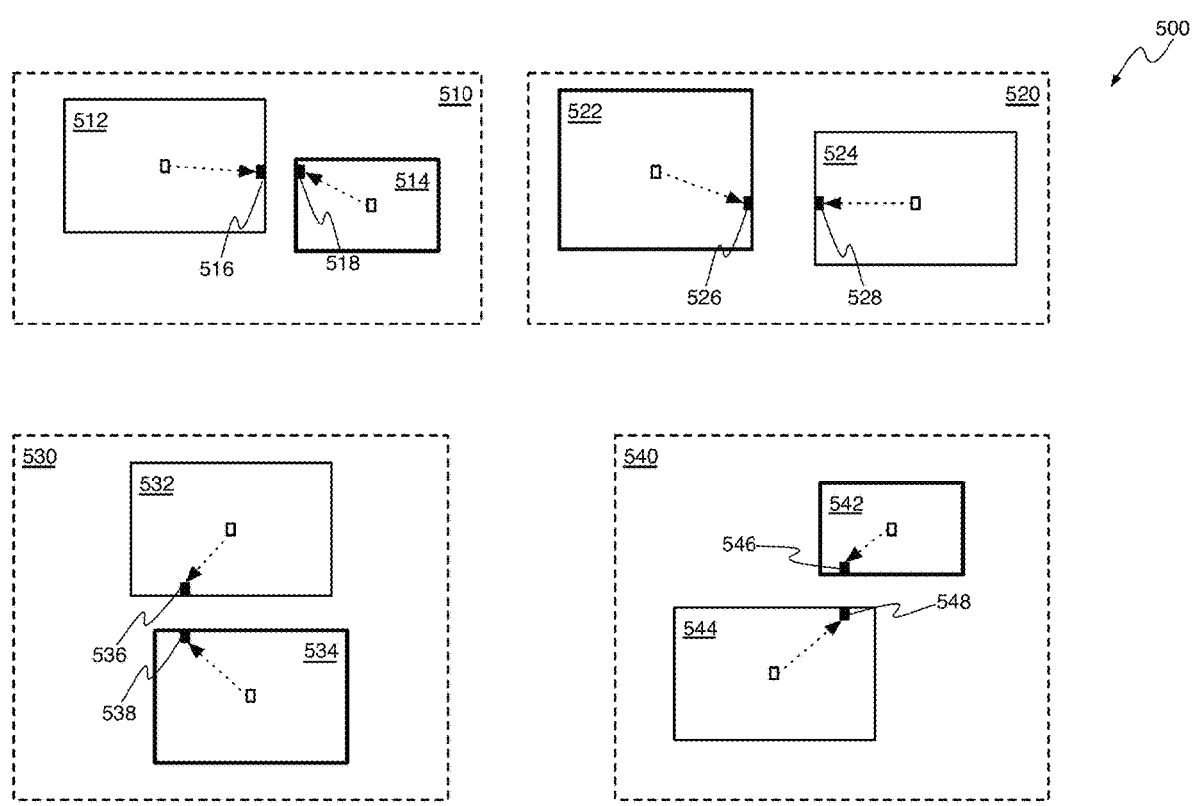
FIG. 5 is a diagram illustrating various relative display alignments.

FIG. 5 is a diagram 500 illustrating various relative display alignments. While the forced user interaction alignment procedure was described above using an example a horizontal arrangement of displays and vertical alignment adjustments, other display device arrangements and alignments can be determined and corrected using the forced user interaction procedure described above.

Diagram 500 includes display device/display buffer arrangement 510. For example, arrangement 510 is similar to the arrangement of FIG. 4. Arrangement 510 can include a primary display device corresponding to display buffer 514 and a secondary (e.g., added) display device corresponding to display buffer 512. Based on the user input moving graphical objects 516 and 518, display controller 104 can determine that secondary display device was added to the left of the primary display device and position display buffer 512 to the left of display buffer 514. Moreover, based on the user input, display controller 104 can determine the respective alignment locations (e.g., pixel rows) of graphical objects 516 and 518 and adjust the vertical position (e.g., up or down offset) of display buffer 512 relative to display buffer 514 so that the alignment locations are aligned horizontally.

Diagram 500 includes display device/display buffer arrangement 520. For example, arrangement 520 is similar to the arrangement of FIG. 4. Arrangement 520 can include a primary display device corresponding to display buffer 522 and a secondary (e.g., added) display device corresponding to display buffer 524. Based on the user input moving graphical objects 526 and 528, display controller 104 can determine that secondary display device was added to the right of the primary display device and position display buffer 524 to the right of display buffer 522. Moreover, based on the user input, display controller 104 can determine the respective alignment locations (e.g., pixel rows) of graphical objects 526 and 528 and adjust the vertical position (e.g., up or down offset) of display buffer 524 relative to display buffer 522 so that the alignment locations are aligned horizontally.

Diagram 500 includes display device/display buffer arrangement 530. Arrangement 530 can include a primary display device corresponding to display buffer 534 and a secondary (e.g., added) display device corresponding to display buffer 532. Based on the user input moving graphical objects 536 and 538, display controller 104 can determine that secondary display device was added to above the primary display device and position display buffer 524 above display buffer 522. Moreover, based on the user input, display controller 104 can determine the respective alignment locations (e.g., pixel columns) of graphical objects 536 and 538 and adjust the horizontal position (e.g., right or left offset) of display buffer 532 relative to display buffer 534 so that the alignment locations are aligned vertically.

Diagram 500 includes display device/display buffer arrangement 540. Arrangement 540 can include a primary display device corresponding to display buffer 542 and a secondary (e.g., added) display device corresponding to display buffer 544. Based on the user input moving graphical objects 546 and 548, display controller 104 can determine that secondary display device was added to below the primary display device and position display buffer 544 below display buffer 542. Moreover, based on the user input, display controller 104 can determine the respective alignment locations (e.g., pixel columns) of graphical objects 546 and 548 and adjust the horizontal position (e.g., right or left offset) of display buffer 544 relative to display buffer 542 so that the alignment locations are aligned vertically.

Accordingly, the forced user interaction alignment procedure described above can be implemented to align display buffers in a multiple display system such that the arrangement (e.g., relative positions and/or alignment) of the display buffers closely matches or corresponds to the real-world arrangement of the physical display devices. By arranging the display buffers to correspond to the arrangement of the physical display devices, user device 102 and/or display controller 104 can present graphical objects on the display devices when moving the graphical object between display devices according to the user's expectations. Thus, user device 102 can be configured to avoid frustrating or confusing the user and improve the user experience when working with multiple display devices.

While FIG. 4 and FIG. 5 describe a forced interaction mechanism for receiving user input specifying the relative positions and alignment of display devices in a multiple display system, display controller 104 may observe other user interactions with user device 102 and the multiple displays connected to user device 102 to dynamically and/or covertly adjust the alignment of display devices in a multiple display system to improve the user experience. For example, these covert adjustments may be performed based on historical user interaction data that describes movements between display devices. The covert adjustments may be performed based on real time or very recent user interaction data that describes movements between display devices.

Figure 6:
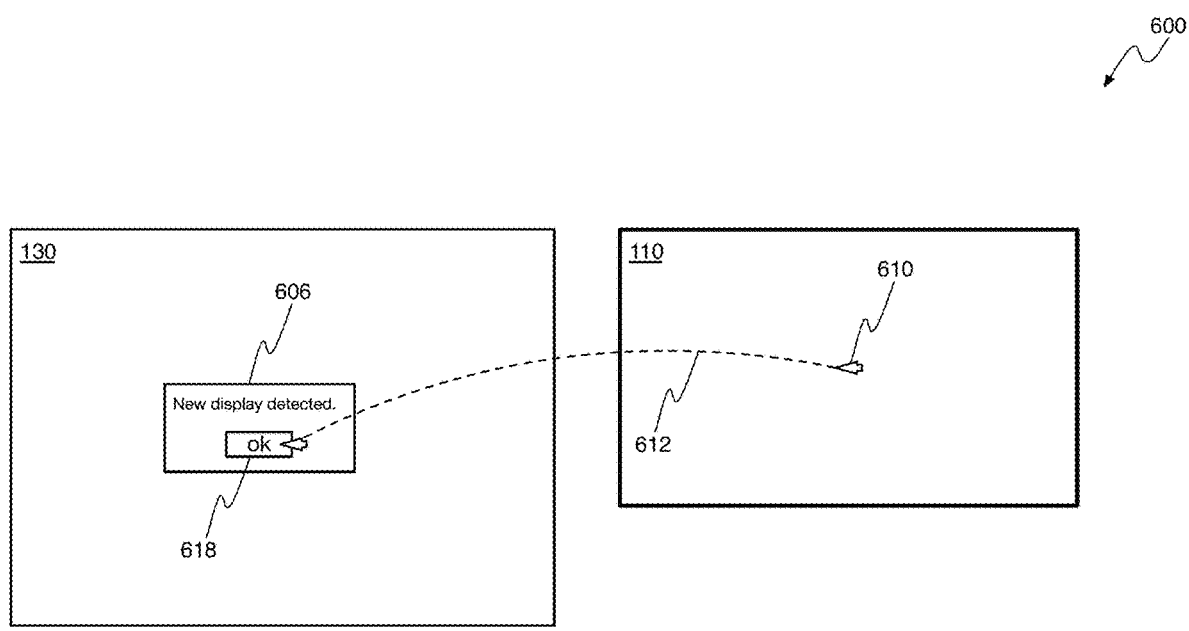
FIG. 6 illustrates an example graphical user interface for provoking multiple display interaction to determine display alignment.

FIG. 6 illustrates an example graphical user interface 600 for provoking multiple display interaction to determine display alignment. In some implementations, GUI 600 can be presented when a changed display arrangement is detected. For example, a change to the current display arrangement can be detected when a new display device is connected to user device 102. For example, when user device 102, already connected to display device 110, detects a new display device 130 connected to user device 102, user device 102 can present GUI 600 across display device 110 and display device 130. In particular, since display device 110 was already connected to user device 102, user device 102 may present graphical object 610 (e.g., a cursor, window, icon, etc.) on display device 110. For example, user device 102 may present graphical object 610 in the center, or near centered, on display device 110. To provoke a cross display user interaction, user device 102 can present a prompt 606 on the newly connected display device 130. For example, prompt 606 may require a user to provide some user input with respect to prompt 606 (e.g., selection of the "ok" button 618) to dismiss prompt 606. Prompt 606 can, for example, be a modal dialog box that simply requires the user to provide input to acknowledge that a new display device has been connected to user device 102 and disallows user interaction with any other graphical element until button 618 is selected.

In some implementations, a change to the current display arrangement can be detected using various sensors. For example, a motion sensor attached to a display device (e.g., a laptop computer, a tablet computer, a smartphone, etc.) can detect movement of the display device and cause GUI 600 to be presented. A sound sensor (e.g., microphone) of a computing device can detect a sound associated with moving a display device and cause GUI 600 to be presented. A light sensor can detect a change in ambient light emitted by the current display devices and can cause GUI 600 to be presented. For example, when user device 102, already connected to display device 110 and display device 130, detects change to the current display configuration using one or more of the sensors described above, user device 102 can present GUI 600 across display device 110 and display device 130. In particular, if user device 102 is currently presenting graphical object 610 (e.g., a cursor, window, icon, etc.) on display device 110, user device 102 can present a prompt 606 on the display device 130 to provoke a cross display user interaction. For example, prompt 606 may require a user to provide some user input with respect to prompt 606 (e.g., selection of the "ok" button 618) to dismiss prompt 606. Prompt 606 can, for example, be a modal dialog box that simply requires the user to provide input to acknowledge that a new display device has been connected to user device 102 and disallows user interaction with any other graphical element until button 618 is selected.

In some implementations, the cross-display interaction can be analyzed to determine whether display device 110 and the new display device 130 are arranged and/or aligned correctly. For example, display controller 104 can analyze the trajectory and/or path (e.g., curve, arc, etc.) along which the user has moved graphical object 610 from display device 110 to reach the destination location (e.g., "ok" button 618) on display device 130. Based on the analysis, display controller 104 can determine if the user provided input to correct the path of graphical object 610 when the graphical object was presented on display device 130. For example, humans typically plan movements involving coordination of multiple joints and degrees of freedom resulting in smooth and continuous arcs. If the user made a corrective input (e.g., indicated by a discontinuity of movement) when moving toward the destination location on display device 130, display controller 104 can determine that the alignment or arrangement of the display buffer of display device 130 with respect to the display buffer of display device 110 is incorrect. Display controller 104 can analyze the initial path of graphical object 610 on display device 110 to determine how to make the arrangement and/or alignment correction necessary to properly align the display buffers, as described in further detail below.

Figure 7:
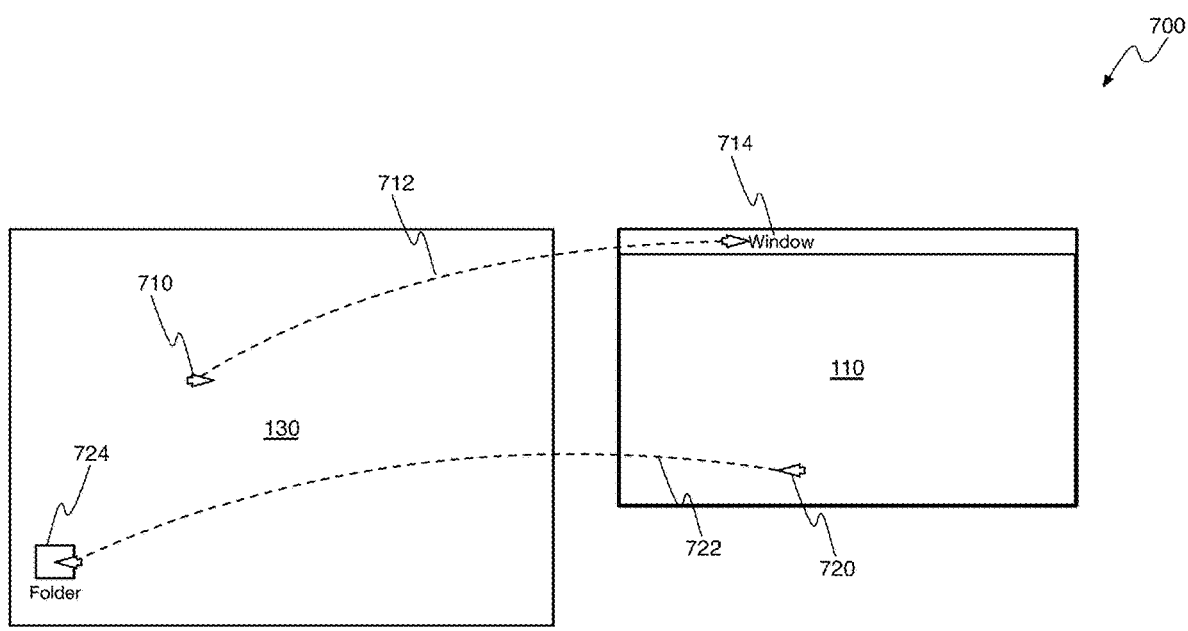
FIG. 7 illustrates an example graphical user interface for observing multiple display interactions to determine display alignment.

FIG. 7 illustrates an example graphical user interface 700 for observing multiple display interactions to determine display alignment. In some implementations, display controller 104 can observe naturally occurring (e.g., spontaneous, unprovoked, etc.) user interactions with respect to GUI 700 to determine when display buffer alignment adjustments are required for a multiple display system. For example, user device 102 may already be connected to display device 110 and display device 130. User device 102 can present (e.g., extend) GUI 700 across display device 110 and display device 130. User device 102 may be presenting graphical object 710/720 (e.g., a cursor, window, icon, etc.) on display device 110 or display device 130. Display controller 104 can determine (e.g., based on a current user interaction, based on historical user interactions) when a user interaction moves between display device 110 and display device 130 and use the cross-display interactions to determine when to correct the alignment of the corresponding display buffers.

In some implementations, the cross-display interaction can be analyzed to determine whether display device 110 and display device 130 are arranged and/or aligned correctly. For example, display controller 104 can analyze the trajectory and/or path (e.g., curve, arc, etc.) along which the user has moved graphical object 710 from display device 130 to reach the destination location (e.g., "window" menu item 714) on display device 110. Similarly, display controller 104 can analyze the trajectory and/or path (e.g., curve, arc, etc.) along which the user has moved graphical object 720 from display device 110 to reach the destination location (e.g., "Folder" icon 724) on display device 130. Based on the analysis, display controller 104 can determine if the user provided input to correct the path of graphical object 710/720 when the graphical object was presented on the destination display device. If the user made a corrective input when moving toward the destination location on the destination display device, display controller 104 can determine that the alignment or arrangement of the display buffer of display device 130 with respect to the display buffer of display device 110 is incorrect. In some implementations, display controller 104 can analyze the initial path of graphical object 710/720 on the originating display device (e.g., display device 130 for graphical object 710, display device 110 for graphical object 720) to determine how to make the arrangement and/or alignment correction necessary to properly align the display buffers of display device 110 and display device 130, as described in further detail below.

Display controller 104 can perform this passive observation and display buffer alignment technique for each cross-display interaction. Display controller 104 can perform this passive observation and display buffer alignment technique periodically on a sampling of historical cross-display interactions. Display controller 104 can perform this passive observation and display buffer alignment technique on a random selection of current or recent cross display interactions.

Figure 8:
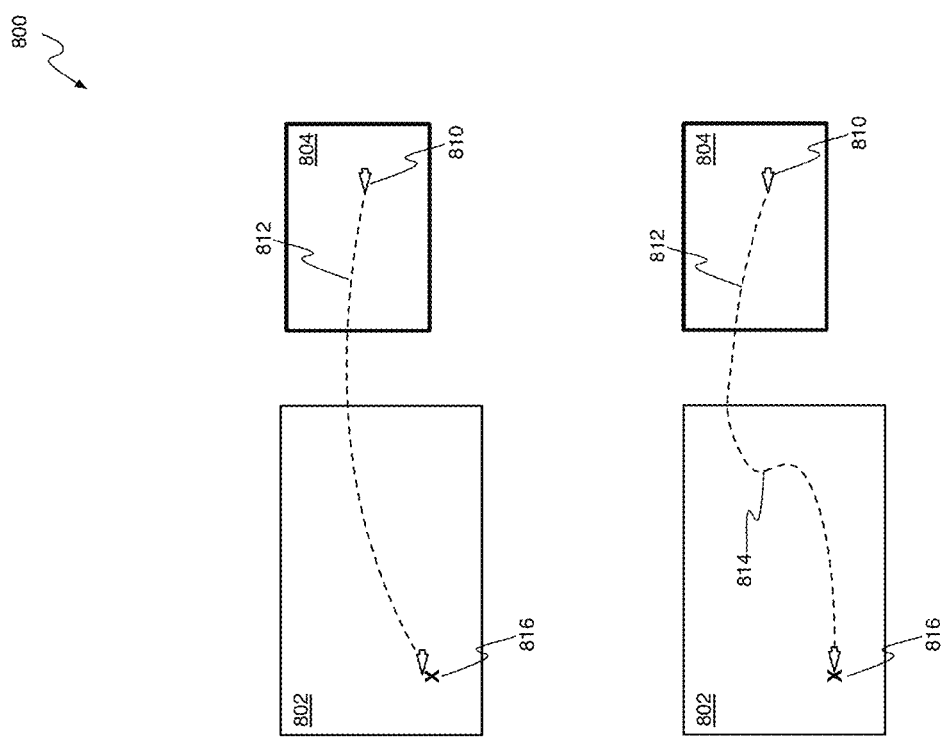
FIG. 8 is a diagram illustrating a cross-display movement path indicative of misaligned display buffers.

FIG. 8 is a diagram 800 illustrating a cross-display movement path indicative of misaligned display buffers. For example, diagram 800 includes display device 802 and display device 804 that are part of a multiple display system. The user of the system may want to move graphical object 810 (e.g., a cursor) presented on display device 804 to a destination or destination location 816 (e.g., target location) on display device 816. To cause graphical object 810 to reach destination location 816, the user can provide input to move graphical object 810 along path 812. When the display buffers corresponding to display device 802 and display device 804 are aligned correspondingly to the real-world relative positions (e.g., arrangement) of display device 802 and display device 804, path 812 will typically follow a continuous curve from the starting location of graphical object 810 across display device 804 and across display device 802 to destination location 816.

However, when the display buffers corresponding to display device 802 and display device 804 are not aligned correspondingly to the real-world relative positions (e.g., arrangement) of display device 802 and display device 804, the user will need to provide input to correct the path 812 of graphical object 810 to reach destination location 816, as illustrated by the discontinuity 814 in the curve of path 812. For example, because the display buffers were misaligned, graphical object 810 entered the right edge of display device 802 at too high of a location to continue along the curve corresponding to the path 812 started on display device 804 and the user was required to make a correction (e.g., discontinuity 814) to cause graphical object 810 to reach destination location 816.

In some implementations, display controller 104 can detect user corrections to the movement path between display devices to determine when the display buffers for the display devices are misaligned. For example, display controller 104 can analyze path 812 to determine if there are any discontinuities introduced at the destination display device 802 in the curve of the path started on display device 804. When a discontinuity is found, or detected, display controller 104 can adjust the alignment of the display buffers based on the curve of path 812 started on display device 804, as described in further detail below.

Figure 9:
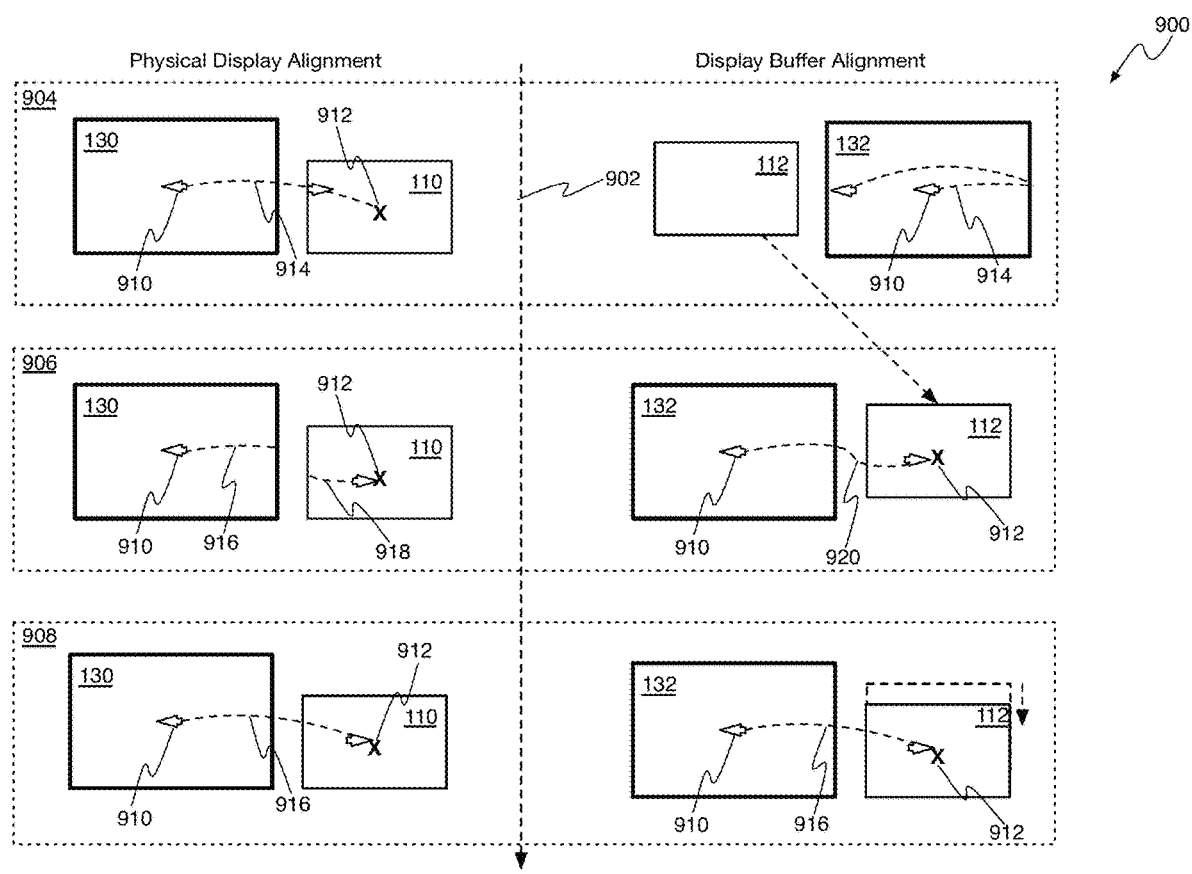
FIG. 9 is a diagram illustrating alignment of display buffers based on observed cross-display interactions.

FIG. 9 is a diagram 900 illustrating alignment of display buffers based on observed cross-display interactions. For example, the cross-display user interactions can be provoked (as illustrated by FIG. 6) or passively observed (as illustrated by FIG. 7). The analysis of the paths of the cross-display interactions (e.g., user directed movements of graphical objects from device to device) and adjustments of display buffer alignments can be performed in response to detecting a cross-display interaction, periodically (e.g., nightly, weekly, etc.), in response to detecting specific contexts (e.g., user device is idle, not in use), or a combination thereof. For example, display controller 104 can, on a nightly basis, filter historical user interaction data to identify cross-display interactions occurring during the preceding day. Display controller 104 can analyze the paths of these cross-display interactions to determine whether any user corrections to the paths can be detected. When a user correction is detected, display controller 104 can adjust the relative positions, or arrangement, of the display buffers so that they more closely represent the arrangement of the physical display devices.

Diagram 900 illustrates multiple stages 904, 906, 908 of procedure for aligning display buffers based on observed cross-display user interactions. Each stage shows the physical alignment, or arrangement, of display devices 110 and 130 on the left side of timeline 902 and the virtual alignment, or arrangement, of the corresponding display buffers 112 and 132 on the right side of timeline 902.

The description of diagram 900 starts at stage 904 with misaligned buffers 112 and 132 corresponding to display devices 110 and 130, respectively. For example, while the display device 130 is physically arranged to the left of display device 110, the display buffer 132 corresponding to display device 130 is virtually arranged to the right of display buffer 112 corresponding to display device 110. Moreover, while display devices 110 and 130 are aligned along their bottom edges, display buffers 112 and 132 are centered vertically relative to each other. Thus, the misalignment of the display buffers compared to the physical arrangement of the display devices will cause the user to correct the path of movement when moving graphical objects between display devices 110 and 130, as described in further detail below.

As the user moves graphical object 910 from display device 130 to destination 912 (e.g., target location) on display device 110, the user will provide input to move graphical object 910 along a smooth path (e.g., arc, curve, trajectory, etc.) toward destination location 912. For example, the user can indicate destination location 912 by providing some user input, such as mouse click, selection of a graphical object, releasing a graphical object (e.g., when moving a GUI object from one display to another), or other movement termination event that indicates destination location 912. The process of analyzing a path and realigning display buffers can be performed after receiving the input indicating destination location. For example, the analysis and realignment of display buffers can be performed after the user has confirmed that the user intended to move between display devices, as implied or indicated by the user input at the destination location 912 (e.g., the user's target) on the second display device 110. In order to move graphical object 910 across display device 130, the location of graphical object 910 in display buffer 132 must be updated based on the user input to move graphical object 910 along path 914 so that display buffer 130 can be used by display controller 104 to generate the frames of video presented by display device 130.

In some implementations, display controller 104 can determine the direction of travel of graphical object 910 along path 914 to determine the relative position (e.g., to the right, left, above, below, etc.) of display device 110. For example, after display controller 104 receives the user input indicating destination location 912 on display device 110, display controller 104 can analyze the direction of path 914 to determine whether display buffer 112 for the destination display device 110 is on the correct side of display buffer 132. As depicted at stage 904, since display device 110 is physical arranged to the right of display 130, the user will provide input moving graphical object 910 to the right on display device 130 to reach destination location 912.

However, since the display buffer 112 for display device 110 is arranged to the left of display buffer 132, when graphical object 910 reaches the right edge of display device 130, the user will have to reverse course and move graphical object 910 to the left off the left edge of display device 130 to cause graphical object 910 to move onto display device 110/display buffer 112. If this movement (e.g., the user hitting the edge of the display, moving in the opposite direction, and identifying a destination on another display device) is done within a period of time or near continuously from start location to destination location, display controller 104 can identify this as a corrective movement with respect to relative display positioning and rearrange the relative positions of the display devices. For example, display controller 104 can detect this corrective movement and determine that destination display device (e.g., display device 112) is actually located in the initial direction of travel (e.g., to the right) of path 914 on display device 132. Display controller 104 can then rearrange the relative positions of display buffer 112 and display buffer 132 so that display buffer 112 is to the right of display buffer 132, as depicted in stage 906. Thus, when the user subsequently provides input to move graphical object 910 to the right from display device 130 to display device 110, the graphical object 910 will move to the right off display device 130 and onto display device 110 as expected given the physical orientation of the display devices. Graphical object 910 will show up as expected on display device 110 because the display buffers 112 and 132 are now arranged similar to the relative positions of display device 110 and display device 130.

However, even though the display buffers 112/132 may be arranged on the appropriate sides of each other, the display buffers 112/132 may not be aligned correctly to produce the expected behavior when graphical object 910 is moved from display device 130 to display device 110 (or vice versa).

Referring to stage 906, a user may provide input to user device 102 to move graphical object 910 from display device 130 to destination location 912 on display device 110. When initiating the move on display device 130, the user will typically move graphical object 910 along a path 916 (e.g., a continuous curve) on display device 130 toward destination location 912. However, when the display buffers for display device 130 and display device 110 (e.g., display buffer 132 and display buffer 112, respectively) are misaligned, in this case vertically misaligned, with respect to the relative positions of display device 130 and display device 110, the user will need to provide input correcting the path of graphical object 910 on display device 110 so that graphical object 910 reaches destination location 912 on display device 912. For example, when display buffer 132 and 112 are misaligned with respect to the relative physical positions of display device 130 and display device 110, graphical object 910 will appear too low (or too high) on display device 110 (and display buffer 112). Thus, the user will need to move graphical object 910 in an upwardly curved path 918 to cause graphical object 910 to reach destination location 912 on display device 110. The change in trajectory of the initial path 916 creates a discontinuity in the curve of path 916 from display device 130 to destination location 912 on display device 110 that can be used by user device 102 to determine when display buffer 132 and display buffer 112 are misaligned. For example, use device 102 can fit a curve to path 920 (e.g., a curve based on the combination of path 916 and path 918) between display buffer 132 and display buffer 112 (e.g., display device 130 and display device 110, respectively) using well-known curve fitting algorithms. User device 102 can numerically integrate the curve of path 920 and determine if there are any discontinuities. For example, user device 102 can determine if there are any discontinuities in the first derivative or the second derivative of the curve. If a discontinuity in the curve of path 920 is identified, then user device 102 can adjust the relative alignment of display buffer 132 and display buffer 112.

At stage 908, user device 102 can adjust the relative alignment of display buffer 132 and display buffer 112 based on the curve of initial path 916 on display buffer 132 (e.g., display device 130). For example, user device 102 can use the display alignment model of FIG. 3 to project the curve of initial path 916 beyond the edge of display buffer 132 in the direction of the movement of graphical object 910 (e.g., towards display buffer 912). User device 102 can then adjust the alignment of display buffer 112 (e.g., indicated by dashed downward arrow and dashed outline of previous location of display buffer 112) so that the destination location 912 indicated by the user is on the projected curve of path 916. Thus, display buffer 112 can be aligned with display buffer 132 so that the alignment of the display buffers more closely matches the alignment of the physical display devices 130 and 110.

In some implementations, user device 102 can adjust the alignment of display buffers based on multiple user interactions with the display device 110 and display device 130. For example, a single multi-display user interaction may not provide enough information to correctly align display buffers 112 and 132 to match the physical alignment of display devices 110 and 130. When display devices 110 and 130 are positioned left and right of each other, as depicted in FIG. 9, user device 102 may adjust the relative alignment of display buffer 112 downward with respect to display buffer 132 based on a user interaction but this adjustment may not account for the spacing between display devices. Thus, on a subsequent interaction the user may provide input to correct the input path again when moving between displays because user device 102 did not calculate where to display the graphical object 910 based on a correct spacing between display buffer 112 and display device 132 even though the vertical alignment was previously adjusted. By adjusting the relative alignment of display buffer 112 to fit multiple user interactions (e.g. multiple path curves and corresponding destination locations), user device 102 can adjust the alignment of display buffer 112 up and down (e.g., or left and right if displays are arranged vertically) and the spacing between display buffers 112 and 132 so that for all of the analyzed user interactions, all of the destination locations intersect the corresponding path curves. Thus, adjusting the alignment of the display buffers based on multiple user interactions (e.g., historical user interactions, previous user interactions) may result in a more accurate alignment of the display buffers that more closely represents the actual physical alignment of display devices 110 and 130.

Figure 10:
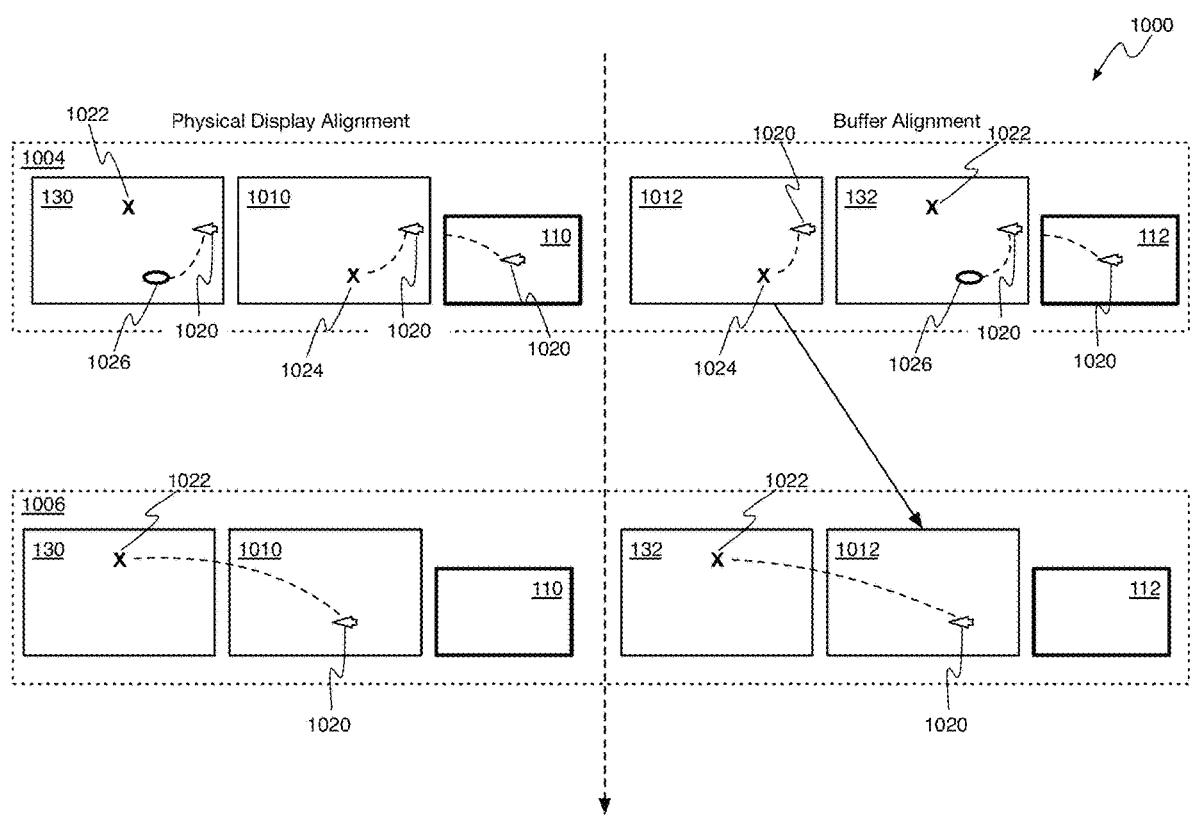
FIG. 10 is a diagram illustrating alignment of multiple external display buffers based on observed cross-display interactions.

FIG. 10 is a diagram 1000 illustrating alignment of multiple external display buffers based on observed cross-display interactions. For example, diagram 1000 illustrates how a computing device can align external display buffers for multiple external display devices when the external display devices are adjacent. The alignment process illustrated by diagram 1000 can be performed by provoking a user interaction (e.g., presenting GUI targets that the user must select) or by otherwise observing user interactions with graphical object (e.g., GUI targets) on different external displays, as described herein.

In some implementations, user device 102 can detect the addition of one or more external display devices 130 and/or 1010 to user device 102 that includes display device 110. User device 102 can detect an event that may indicate a change in the alignment, orientation, or configuration of the various display devices 130, 1010, and/or 110 with respect to each other. In response to detecting a change in the configuration of the display devices 130, 1010, and/or 110 connected to user device 102, user device 102 can initiate a provoked (e.g., forced, prompted, etc.) or observed alignment process, as described herein.

At stage 1004, user device 102 can initially align display buffers 1012, 132, and or 112 corresponding to physical display devices 130, 1010, and 110 according to default alignment data or previously determined alignment data, as described above. In the example of stage 1004, user device 102 can initially align the display buffers with display buffer 1012 on the far left, display buffer 112 on the far right, and display buffer 132 between display buffer 1012 and display buffer 112. As illustrated by the physical display alignment of display device 130, display device 1010, and display device 110, the initial display buffer alignment may not represent the real-world physical locations of the display devices. For example, the real-world alignment of the display devices may have display device 130 positioned at the far left, display device 110 at the far right, and display device 1010 between (e.g., in the middle of) display device 110 and display device 130.

To align or position the display buffers so that they match the real-world alignment of the physical display devices and will therefore present graphical objects in the appropriate locations on the display devices when the graphical objects are moved between display devices and/or display buffers, user device 102 can perform a display buffer alignment operation based on observed user input (e.g., provoked or passive), as described herein above and below.

When performing the provoked or prompted display buffer alignment operation, user device 102 can, in response to detecting a change in display device alignment (e.g., a repositioning or display device addition), present graphical object 1020 (e.g., a cursor, a pointer, an input position indicator, etc.) on one of the display devices (e.g., display device 110) and present graphical targets 1022, 1024 (e.g., prompts that require user input, prompt 606, etc.) on the other display devices (e.g., display device 130, display device 110. These graphical objects will, of course, be correspondingly represented in display buffers 1012, 132, and 112.

In some implementations, graphical object 1020 can be initially presented on the primary display device (e.g., display device 110) when performing the alignment operation. In some implementations, graphical object 1020 can be presented at its current location on a previously connected display device. For example, if user device 102 was previously connected to display device 110 and display device 130 and graphical object 1020 was located on display device 110 when the alignment operation was initiated by user device 102, then graphical object 1020 can remain presented at its location on display device 110.

In some implementations, graphical targets 1022, 1024 (e.g., prompts, passive targets, etc.) can be presented on the other display devices (e.g., display devices 130, 1010, etc.) that are not currently presenting graphical object 1020. For example, each of the display devices 130, 1010 can present one prompt that requests user input. Graphical targets 1022, 1024 can be presented at different locations on each display device so that the user will move graphical object 1020 along different trajectories to reach each target. For example, graphical target 1022 can be presented at a different vertical location (e.g., near the top edge of the screen) on display device 130 than the vertical location (e.g., near the bottom edge of the screen) at which graphical target 1024 is presented on display device 1010. Graphical target 1022 can be presented at a different horizontal location (e.g., near the left edge of the screen) on display device 130 than the vertical location (e.g., near the right edge of the screen) at which graphical target 1024 is presented on display device 1010.

When graphical targets 1022, 1024 are presented on display device 120 and display device 1010, the user may provide input to user device 102 to move graphical object 1020 toward one of the graphical targets 1022, 1024. Since display device 1010 is physically positioned closer to display device 110 than display device 130, the user will likely move graphical object 1020 from its location on display 110 toward GUI target 1024 on display device 1010. When graphical object 1020 is moved off the edge (e.g., left edge) of the screen of display device 110, user device 102 can present graphical object 1020 on the right edge of the screens on display device 130 and display device 1010. For example, since the user has moved graphical object 1020 to the left off display device 110, user device 102 can initially determine that display device 130 and/or display device 1010 is positioned to the left of display device 110 and present graphical object 1020 on the right side of the screens of display device 130 and display device 1010. To be clear, graphical object 1020 will now be presented on both display device 130 and display device 1010.

As the user moves graphical object 1020 on display device 130 and display device 1010 (e.g., the same user input moves graphical object 1020 on both devices), user device 102 can record the trajectory of the movement until the user moves graphical object 1020 to one of the graphical targets 1022 or 1024. For example, since graphical targets 1022 and 1024 are positioned in horizontally and/or vertically different locations on each display device 130, 1010, the user input moving graphical object 1020 on both devices will not cause graphical object 1020 to intersect both graphical target 1022 and graphical target 1024 at the same time. Thus, when the user moves graphical object 1020 to a graphical target 1022 or 1024 and provides input selecting the graphical target (e.g., an 'ok' button, a file, a folder, etc.), user device 102 can determine which display device the user is focused on and align that display device with the display device that initially presented graphical object 1020. For example, since the location of graphical object 1020 corresponds to the location of graphical target 1024 on display device 1010 when the user input indicating a selection was received, user device 102 can determine that the user's focus was on display device 1010. Conversely, since the location of graphical object 1020 corresponds to a location where no graphical target is located (as illustrated by empty circle 1026) on display device 130 when the user input indicating a selection was received, user device 102 can determine that the user's focus was not on display device 1010.

As illustrated in the example of stage 1004, the user may move graphical object 1020 off the left edge of display device 110 and select graphical target 1024 on display device 1010 since display device 1010 is physically positioned closest to display device 110. After receiving the user input selecting graphical target 1024, user device 102 can analyze the path (e.g., trajectory) along which the user moved graphical object 1020 to reach graphical target 1024 (e.g., destination location 1024), to determine how to align display buffer 1011 with display buffer 112, as described above. In this example, since the display buffer 1012 is positioned incorrectly with respect to display buffer 112 and display buffer 132, user device 102 can reposition display buffer 1012 so that it is adjacent to display buffer 112 and between display buffer 112 and display buffer 132, as illustrated by the arrow between stage 1004 and stage 1006.

At stage 1006, user device 102 has aligned display buffer 1012 with display buffer 112 but user device 102 has not yet aligned display buffer 132 with respect to display buffer 1012 and/or display buffer 112. Thus, the display buffer alignment operation can continue at stage 1006 with graphical object 1020 presented on display device 1010 at the location where graphical target 1024 was previously presented. For example, graphical target 1024 can be dismissed or hidden by user device 102 after being selected by the user. Since graphical target 1022 was not selected by the user, user device 102 can continue to present graphical target 1022 on display device 130. Seeing the graphical target 1022 (e.g., a user prompt), the user may move graphical object 1020 onto display device 130 to select graphical target 1022. After receiving user input to move graphical object 1020 to the location of graphical target 1022 and receiving user input selecting graphical target 1022, user device 102 can align display buffer 132 with respect to display buffer 1012 and/or display buffer 112 based on the path or trajectory along which the user moved graphical object 1020 to reach graphical target 1022 (e.g., the destination location), as described above. Thus, display buffers 112, 132, and 1012 can be aligned by observing how the user moves graphical object 1020 between display devices to select the graphical targets.

While the above description of FIG. 10 primarily describes analyzing a prompted (e.g., provoked) user interaction to align display buffers, a similar approach can be used to align display buffers during an unprompted user interaction. For example, instead of presenting user input prompting graphical targets 1022, 1024, user device 102 can monitor user input that moves graphical object 1020 to passive graphical targets 1022, 1024. For example, passive graphical targets can correspond to menus, files, folders, or other graphical objects that are normally presented on a display screen during normal operation. User device 102 can monitor the user's movement of graphical object 1020, receive a user selection input selecting a graphical target, determine which display (e.g., display 1010, display 130) is currently presenting a graphical target (e.g., graphical target 1024) at the location where the user selection input was received, and align the corresponding display buffer based on the path along which graphical object 1020 was moved by the user. Thus, display buffers 112, 132, and 1012 can be aligned by observing how the user moves graphical object 1020 between display devices to select the non-prompting graphical targets.

Figure 11:
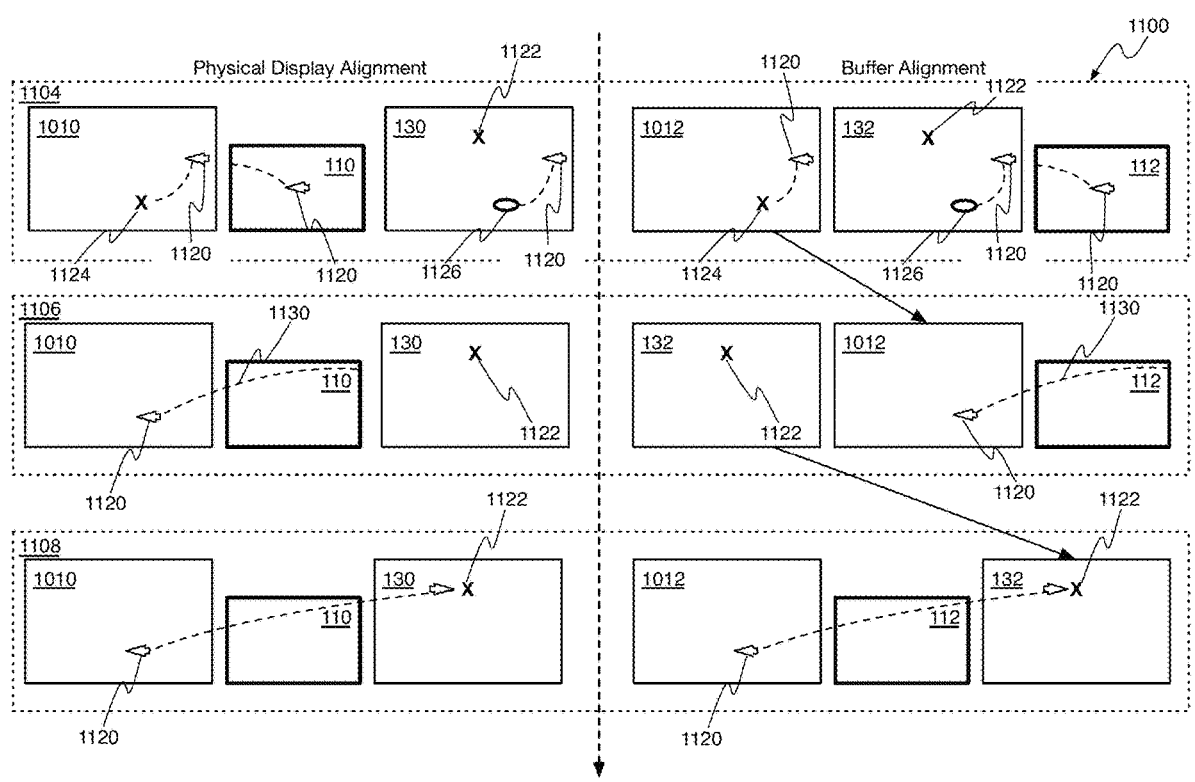
FIG. 11 is a diagram illustrating alignment of multiple external display buffers based on observed cross-display interactions.

FIG. 11 is a diagram 1100 illustrating alignment of multiple external display buffers based on observed cross-display interactions. For example, diagram 1100 illustrates how a computing device can align external display buffers for multiple external display devices when the external display devices are not adjacent. The alignment process illustrated by diagram 1100 can be performed by provoking a user interaction (e.g., presenting GUI targets that the user must select) or by otherwise observing user interactions with graphical object (e.g., targets) on different external displays, as described herein.

In some implementations, user device 102 can detect the addition of one or more external display devices 130 and/or 1010 to user device 102 that includes display device 110. User device 102 can detect an event that may indicate a change in the alignment, orientation, or configuration of the various display devices 130, 1010, and/or 110 with respect to each other. In response to detecting a change in the configuration of the display devices 130, 1010, and/or 110 connected to user device 102, user device 102 can initiate an observed (e.g., provoked or unprovoked) alignment process, as described herein.

At stage 1104, user device 102 can initially align display buffers 1012, 132, and or 112 corresponding to physical display devices 130, 1010, and 110 according to default alignment data or previously determined alignment data, as described above. In the example of stage 1104, user device 102 can initially align the display buffers with display buffer 1012 on the far left, display buffer 112 on the far right, and display buffer 132 between display buffer 1012 and display buffer 112. As illustrated by the physical display alignment of display device 130, display device 1010, and display device 110, the initial display buffer alignment may not represent the real-world physical locations of the display devices. For example, the real-world alignment of the display devices may have display device 1010 positioned at the far left, display device 130 at the far right, and display device 110 between (e.g., in the middle of) display device 130 and display device 1010.

To align or position the display buffers so that they match the real-world alignment of the physical display devices and will therefore present graphical objects in the appropriate locations on the display devices when the graphical objects are moved between display devices and/or display buffers, user device 102 can perform a display buffer alignment operation based on observed user input (e.g., provoked or passive), as described herein above and below.

When performing the provoked or prompted display buffer alignment operation, user device 102 can, in response to detecting a change in display device alignment (e.g., a repositioning or display device addition), present graphical object 1120 (e.g., a cursor, a pointer, an input position indicator, etc.) on one of the display devices (e.g., display device 110) and present graphical targets 1122, 1124 (e.g., prompts that require user input, prompt 606, etc.) on the other display devices (e.g., display device 130, display device 110. These graphical objects will, of course, be correspondingly represented in display buffers 1012, 132, and 112 from which the graphics presented on the displays are obtained and/or generated.

In some implementations, graphical object 1120 can be initially presented on the primary display device (e.g., display device 110) when performing the alignment operation. For example, in a multiple display system, one of the display devices can be identified as a primary display device. In some implementations, graphical object 1120 can be presented at its current location on a previously connected display device. For example, if user device 102 was previously connected to display device 110 and display device 130 and graphical object 1120 was located on display device 110 when the alignment operation was initiated by user device 102, then graphical object 1120 can remain presented at its location on display device 110.

In some implementations, graphical targets 1122, 1124 (e.g., prompts, passive targets, etc.) can be presented on the other display devices (e.g., display devices 130, 1010, etc.) that are not currently presenting graphical object 1120. For example, each of the display devices 130, 1010 can present one prompt that requests user input. Graphical targets 1122, 1124 can be presented at different locations on each display device to induce the user to move graphical object 1120 along different trajectories to reach each target. For example, graphical target 1122 can be presented at a different vertical location (e.g., near the top edge of the screen) on display device 130 than the vertical location (e.g., near the bottom edge of the screen) at which graphical target 1124 is presented on display device 1010. Graphical target 1122 can be presented at a different horizontal location (e.g., near the left edge of the screen) on display device 130 than the vertical location (e.g., near the right edge of the screen) at which graphical target 1124 is presented on display device 1110.

When graphical targets 1122, 1124 are presented on display device 120 and display device 1010, the user may provide input to user device 102 to move graphical object 1120 toward one of the graphical targets 1122, 1124. Since display device 1010 and display device 130 are both physically located near display device 110, the user may move graphical object 1120 from its location on display 110 toward GUI target 1124 on display device 1010 or toward GUI target 1122 on display device 130. In the example of FIG. 11, the user has chosen to move graphical object 1120 toward graphical target 1124 presented by display device 1010. When graphical object 1120 is moved off the edge (e.g., left edge) of the screen of display device 110, user device 102 can present graphical object 1120 on the right edge of the screens on display device 130 and display device 1010. For example, since the user has moved graphical object 1120 to the left off display device 110, user device 102 can initially determine that display device 130 and/or display device 1010 is positioned to the left of display device 110 and present graphical object 1120 on the right side of the screens of display device 130 and display device 1010. To be clear, graphical object 1020 will now be presented on both display device 130 and display device 1010.

As the user moves graphical object 1120 on display device 130 and display device 1010 (e.g., the same user input moves graphical object 1120 on both display devices), user device 102 can record the trajectory of the movement until the user moves graphical object 1120 to one of the graphical targets 1122 or 1124. For example, since graphical targets 1122 and 1124 are positioned in horizontally and/or vertically different locations on each display device 130, 1010, the user input moving graphical object 1120 on both devices will not cause graphical object 1020 to intersect both graphical target 1122 and graphical target 1124 at the same time. Thus, when the user moves graphical object 1120 to a graphical target 1122 or 1124 and provides input selecting the graphical target (e.g., an 'ok' button, a file, a folder, etc.), user device 102 can determine which display device the user is focused on and align that display device with the display device that initially presented graphical object 1120. For example, since the location of graphical object 1120 corresponds to the location of graphical target 1124 on display device 1010 when the user input indicating a selection was received, user device 102 can determine that the user's focus was on display device 1010. Conversely, since the location of graphical object 1120 corresponds to a location where no graphical target is located (as illustrated by empty circle 1126) on display device 130 when the user input indicating a selection was received, user device 102 can determine that the user's focus was not on display device 1010.

As illustrated in the example of stage 1104, the user may move graphical object 1120 off the left edge of display device 110 and select graphical target 1124 on display device 1010 since display device 1010. After receiving the user input selecting graphical target 1124, user device 102 can analyze the path (e.g., trajectory) along which the user moved graphical object 1120 to reach graphical target 1124 (e.g., destination location 1124), to determine how to align display buffer 1012 with display buffer 112, as described above. In this example, since the display buffer 1012 is positioned incorrectly with respect to display buffer 112 and display buffer 132, user device 102 can reposition display buffer 1012 so that it is next to display buffer 112 and between display buffer 112 and display buffer 132, as illustrated by the arrow between stage 1104 and stage 1106 indicating the repositioning of display buffer 1012.

At stage 1106, user device 102 has aligned display buffer 1012 with display buffer 112 but user device 102 has not yet aligned display buffer 132 with respect to display buffer 1012 and/or display buffer 112. Thus, the display buffer alignment operation can continue at stage 1106 with graphical object 1120 presented on display device 1010 at the location where graphical target 1124 was previously presented. For example, graphical target 1124 can be dismissed or hidden by user device 102 after being selected by the user. Since graphical target 1122 was not selected by the user, user device 102 can continue to present graphical target 1122 on display device 130. Seeing the graphical target 1122 (e.g., a user prompt), the user may move graphical object 1120 to display device 130 through display device 110 to select graphical target 1022 as indicated by path 1130.

After receiving user input to move graphical object 1120 to the location of graphical target 1122 and/or receiving user input selecting graphical target 1122, user device 102 can align display buffer 132 with respect to display buffer 1012 and/or display buffer 112 based on the path or trajectory (e.g., path 1130) along which the user moved graphical object 1120 to reach graphical target 1122 (e.g., the destination location), as described above. Thus, display buffers 112, 132, and 1012 can be aligned by observing how the user moves graphical object 1120 between display devices to select the graphical targets.

While the above description of FIG. 11 primarily describes analyzing a provoked (e.g., prompted) user interaction to align display buffers, a similar approach can be used to align display buffers during an unprompted user interaction. For example, instead of presenting user input prompting graphical targets 1122, 1124, user device 102 can monitor user input that moves graphical object 1120 to passive graphical targets 1122, 1124. For example, passive graphical targets can correspond to menus, files, folders, or other graphical objects that are normally presented on a display screen during normal operation. User device 102 can monitor the user's movement of graphical object 1120, receive a user selection input selecting a graphical target, determine which display (e.g., display 1010, display 130) is currently presenting a graphical target (e.g., graphical target 1124) at the location where the user selection input was received, and align the corresponding display buffer based on the path along which graphical object 1120 was moved by the user. Thus, display buffers 112, 132, and 1012 can be aligned by observing how the user moves graphical object 1020 between display devices to select the non-prompting graphical targets.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 12:
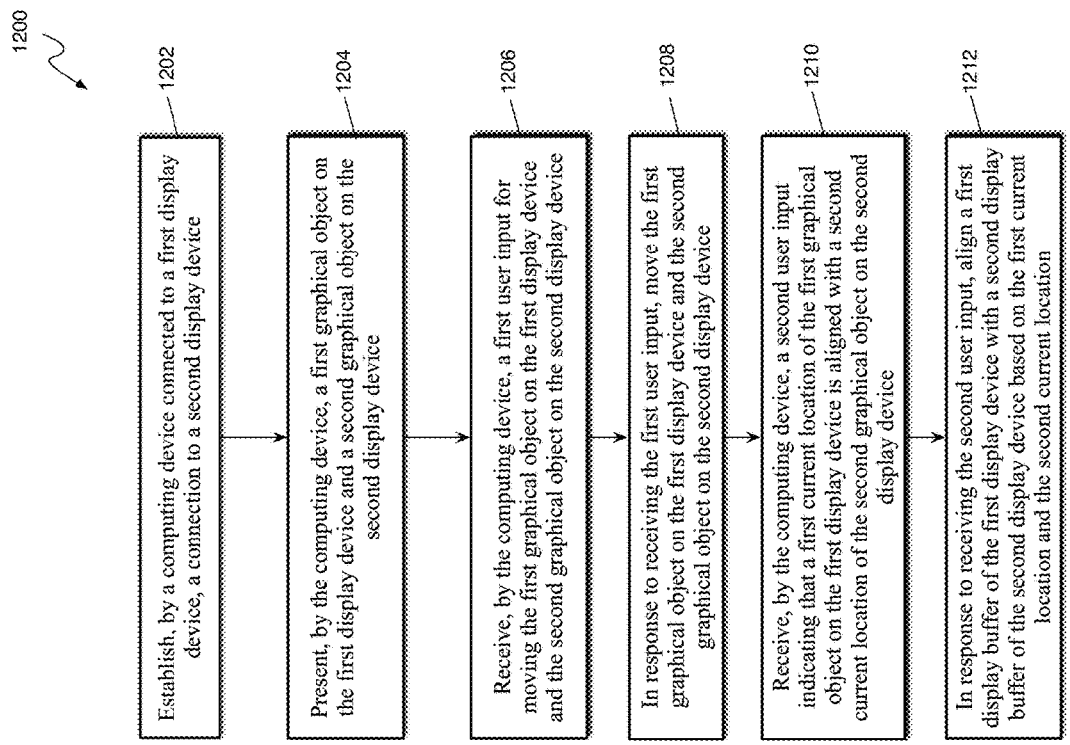
FIG. 12 is flow diagram of an example process for aligning display buffers based on a forced user interaction.

FIG. 12 is flow diagram of an example process 1200 for aligning display buffers based on a forced user interaction. For example, process 1200 can be performed by user device 102 in response to detecting a new connection to a new display device.

At step 1202, user device 102, already connected to a first display device, can establish a connection to a second display device. For example, user device 102 can be a laptop computer with a built-in display that establishes a connection to another display through a video cable. User device 102 can be a desktop computer connected to an external display that establishes a connected to another external display through a video cable. User device 102 can be tablet computer with a built-in display that establishes a wireless connection to a wall mounted display (e.g., television, monitor, etc.).

At step 1204, user device 102 can present a first graphical object the first display device and a second graphical object on the second display device. For example, display controller 104 can present a first graphical object (e.g., a box, a square, an arrow, etc.) on the first display device and a second graphical object (e.g., a box, a square, an arrow, etc.)

on the second display device. To do so, display controller 104 can store data representing the first graphical object and the second graphical object in the display buffers for the respective first and second display devices. Frame data can be generated based on the data in the display buffers and the frames can be sent to the display devices according to the respective frame rates of the display devices, according to well-known practices.

At step 1206, user device 102 can receive a first user input for moving the first graphical object on the first display device and the second graphical object on the second display device. For example, display controller 104 can prompt the user to move the first graphical object on the first display device toward the second graphical object on the second display device to align the first and second graphical objects at the edge of their respective display devices. The user can provide input to move the first and second graphical objects using various input devices, such as a mouse, a trackpad, a keyboard, etc.

At step 1208, user device 102 can, in response to receiving the first user input, move the first graphical object on the first display device and the second graphical object on the second display device. For example, display controller 104 can move the first and second graphical objects in the display buffers corresponding to the first and second display devices to cause the first and second graphical objects to appear to move across the first and second display devices according to the receives first user input. For example, if the user provides input to move the first graphical object in one direction (e.g., upward and to the right on the first display device), display controller 104 can move the second graphical object in the opposite direction (e.g., downward and to the left on the second display device) so that at some point in the movement the first and second graphical objects may be aligned.

At step 1210, user device 102 can receive a second user input indicating that a first current location of the first graphical object on the first display device is aligned with a second current location of the second graphical object on the second display device. For example, display controller 104 can receive a second user input (e.g., a mouse click, a particular keyboard input, etc.) indicating that the first and second graphical objects are aligned. For example, the second user input (e.g., a mouse click) can be different than the first user input (e.g., mouse movement) moving the first and second graphical objects. The user may provide the second user input when the first and second graphical objects are horizontally or vertically aligned to indicate that the current locations of the first graphical object and the second graphical objects are aligned in the current physical orientation of the display devices. For example, when the first display device and the second display device are positioned to the left and right of each other, then the user may provide the second user input when the first and second graphical objects are horizontally aligned (e.g., the row of pixels where the first graphical object is located is aligned with the row of pixels where the second graphical object is located). When the first display device and the second display device are positioned above and below each other, then the user may provide the second user input when the first and second graphical objects are vertically aligned (e.g., the column of pixels where the first graphical object is located is aligned with the column of pixels where the second graphical object is located).

At step 1212, user device 102 can, in response to receiving the second user input, align a first display buffer of the first display device with a second display buffer of the second display device based on the first current location and the second current location. For example, display controller 104 can align the display buffer corresponding to the first display device with the display buffer corresponding to the second display device based on the alignment locations on the display devices (e.g., and in the respective display buffers) indicated by the user with the second user input. The alignment can be performed by determining an offset value corresponding to the number of pixel rows or columns between the alignment positions on the respective display devices or within the corresponding display buffers. For example, the number of pixel rows/columns can be determined by calculating the difference in the pixel row/column indices for each alignment location. For example, when the physical display devices (e.g., and display buffers) are positioned above and below each other, the user indicated alignment location for the first graphical object may be at pixel column 20 and the user indicated alignment location for the second graphical object pixel column 75. Thus, the column offset value for aligning the display buffers can be −50 when moving from the second display buffer to the first display buffer and +50 when moving from the first display buffer to the second display buffer. By adding or subtracting the column offset value to the last location of the graphical object in the previous display buffer of a graphical object being moved between display buffers (e.g., display buffers), display controller 104 can cause the graphical object to appear in the expected location on the destination display device when moving the graphical object between display devices. Similar row offset values can be calculated to align display buffers and move graphical objects between display buffers (e.g., display devices) when the display devices (e.g., display buffers) are arranged to the right and left each other.

Figure 13:
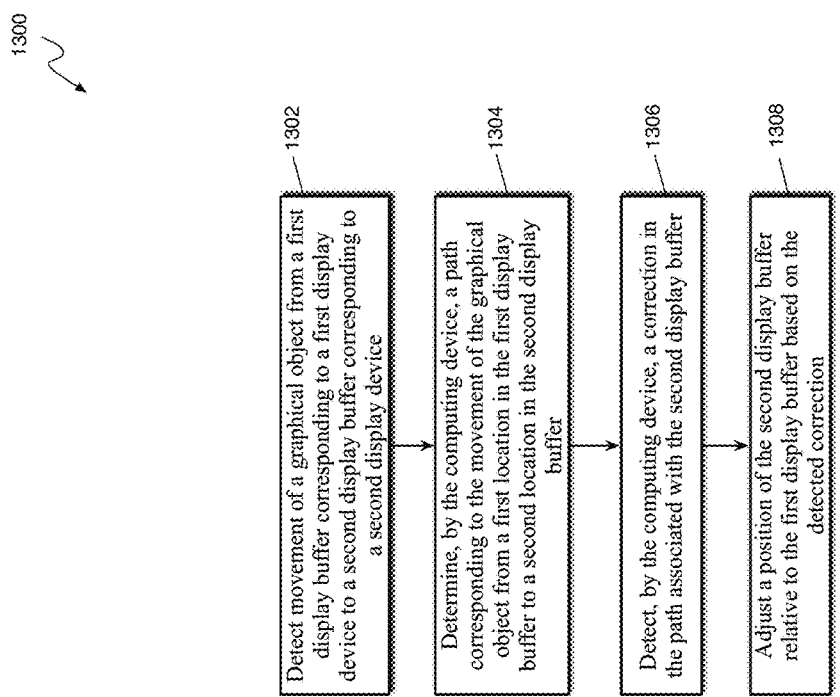
FIG. 13 is a flow diagram of an example process for aligning display buffers based on observed interactions.

FIG. 13 is a flow diagram of an example process 1300 for aligning display buffers based on observed interactions. For example, process 1300 can be performed by a display controller 104 on user device 102 to automatically detect and correct alignment issues between display devices (e.g., display buffers) in a multiple display system. Process 1300 can be implemented to covertly or overtly refine the alignment of display buffers so that the display buffer alignment more closely matches the alignment or positioning of the corresponding physical display devices in the real world. When the display buffers more closely match the physical alignment of the display devices, graphical objects moved between display devices are more likely to appear in user expected locations on the display devices thereby improving the user experience.

At step 1302, user device 102 can detect movement of a graphical object from a first display buffer corresponding to a first display device to a second display buffer corresponding to a second display device. For example, as a user provides input to move a graphical object (e.g., cursor, folder, window, etc.) from a first display device connected to user device 102 to a second display device connected to user device 102, display controller 104 of user device 102 can update the location of the graphical object in the display buffers corresponding to respective display devices. When display controller 104 detects movement of the graphical object between display devices (e.g., from the first display buffer to the second display buffer, or from the second display buffer to the first display buffer), display controller 104 can analyze the movement to determine if an adjustment to the alignment of the display buffers is required.

At step 1304, user device 102 can determine a path corresponding to the movement of the graphical object from a first location in the first display buffer to a second location in the second display buffer. For example, display controller 104 can determine a path along which the user has moved the graphical object from the first location in the first display buffer (e.g., on the first display device) to a second location (e.g., destination location) in the second display buffer (e.g., on the second display device). The second location, or destination location, can be identified by some path terminating action or input taken by the user. For example, the destination location for the path can be identified by user input selecting a graphical object, menu, or some other user input indicative of the target of the movement of the graphical object.

In some implementations, user device 102 can exclude paths, or portions of paths, that are not appropriate or valid for use when determining how to align display buffers. For example, if the path on the initial display is wandering (not well described as an arc) then the user possibly lacked intention and the path is consequently not predictive of an alignment issue, nor useful for making an alignment correction. However, if the initial path is not a ballistic arc, it might be an intentional line and then probably very predictive of the intended path to the target and any deviation on the new display is similarly indicative of an alignment error between display buffers.

At step 1106, user device 102 can detect a correction in the path associated with the second display buffer. For example, display controller 104 can fit a curve to the path of the graphical object as it moves between display buffers and determine whether a discontinuity (e.g., correction) exists in the curve of the path. For example, when display controller 104 detects a first or second derivative discontinuity in the curve of the path, display controller 104 can determine that the user made a correction to the path of the graphical object as the user moved the graphical object from the first display buffer to the second display buffer. For example, the discontinuity may be found in the portion of the path corresponding to, or moving across, the second display buffer when the relative positions of the display buffers (e.g., right/left, top/bottom) are correct but the display buffers are misaligned horizontally or vertically. The discontinuity may be found in the portion of the path corresponding to, or moving across, the first display buffer when the relative positions of the display buffers are incorrect (e.g., right/left positions, top/bottom positions, etc.)

At step 1308, user device 102 can adjust a position of the second display buffer relative to the first display buffer based on the detected correction. For example, in response to detecting a correction in the path of the graphical object, display controller 104 can move the position of the second display buffer relative to the first display buffer such that the destination location intersects a projection of the initial path of the graphical object (e.g., the portion of the path before the user correction). Thus, after adjustment, if the user had continued to move the graphical object along the initial path (e.g., a continuous curve extended or projected from the initial path), the graphical object would have reached the destination location without user input correcting the path.

The above process 1300 describes an display buffer alignment process that adjusts the alignment of a second display buffer relative to a first display buffer by moving the entire second display buffer such that a destination location intersects a projected or extended curve of an initial portion of a path from a starting location to the destination location. However, process 1300 can be performed using multiple user input path/destination location data sets to more accurately align the display buffers. By aligning the second display buffer such that multiple destination locations intersect multiple corresponding projected user input paths, display controller 104 can more accurately determine not only alignment offsets (e.g., horizontal or vertical alignment), but also spacing between display devices so that display controller 104 can better determine where to location graphical objects in display buffers and on display devices when moving graphical objects between display buffers and display devices.

Additionally, the above display alignment approaches could be used to generate different display alignments for different users. For example, by using the forced user interaction approach and/or the observed user interaction approaches described above, the computing device can generate different display alignments for different users that use the same computer and display devices. This may be beneficial when the users have different physical characteristics (e.g., right vs. left hand users, short vs. tall users, etc.) and/or when the users position themselves differently with respect to the display devices when using the computer.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Example System Architecture

Figure 14:
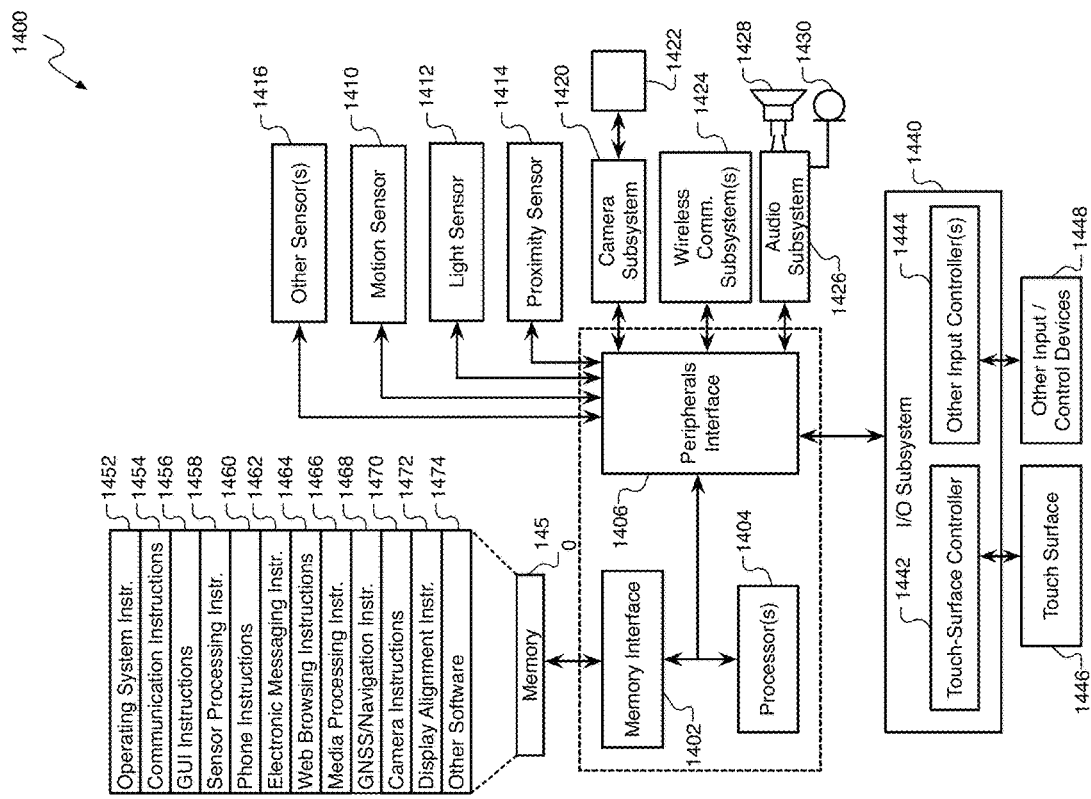
FIG. 14 is a block diagram of an example computing device that can implement the features and processes of FIGS. 1-13.

FIG. 14 is a block diagram of an example computing device 1400 that can implement the features and processes of FIGS. 1-13. The computing device 1400 can include a memory interface 1402, one or more data processors, image processors and/or central processing units 1404, and a peripherals interface 1406. The memory interface 1402, the one or more processors 1404 and/or the peripherals interface 1406 can be separate components or can be integrated in one or more integrated circuits. The various components in the computing device 1400 can be coupled by one or more communication buses or signal lines.

Sensors, devices, and subsystems can be coupled to the peripherals interface 1406 to facilitate multiple functionalities. For example, a motion sensor 1410, a light sensor 1412, and a proximity sensor 1414 can be coupled to the peripherals interface 1406 to facilitate orientation, lighting, and proximity functions. Other sensors 1416 can also be connected to the peripherals interface 1406, such as a global navigation satellite system (GNSS) (e.g., GPS receiver), a temperature sensor, a biometric sensor, magnetometer or other sensing device, to facilitate related functionalities.

A camera subsystem 1420 and an optical sensor 1422, e.g., a charged coupled device (CCD) or a complementary metal-oxide semiconductor (CMOS) optical sensor, can be utilized to facilitate camera functions, such as recording photographs and video clips. The camera subsystem 1420 and the optical sensor 1422 can be used to collect images of a user to be used during authentication of a user, e.g., by performing facial recognition analysis.

Communication functions can be facilitated through one or more wireless communication subsystems 1424, which can include radio frequency receivers and transmitters and/or optical (e.g., infrared) receivers and transmitters. The specific design and implementation of the communication subsystem 1424 can depend on the communication network(s) over which the computing device 1400 is intended to operate. For example, the computing device 1400 can include communication subsystems 1424 designed to operate over a GSM network, a GPRS network, an EDGE network, a Wi-Fi or WiMax network, and a Bluetooth™ network. In particular, the wireless communication subsystems 1424 can include hosting protocols such that the device 100 can be configured as a base station for other wireless devices.

An audio subsystem 1426 can be coupled to a speaker 1428 and a microphone 1430 to facilitate voice-enabled functions, such as speaker recognition, voice replication, digital recording, and telephony functions. The audio subsystem 1426 can be configured to facilitate processing voice commands, voiceprinting and voice authentication, for example.

The I/O subsystem 1440 can include a touch-surface controller 1442 and/or other input controller(s) 1444. The touch-surface controller 1442 can be coupled to a touch surface 1446. The touch surface 1446 and touch-surface controller 1442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1446.

The other input controller(s) 1444 can be coupled to other input/control devices 1448, such as one or more buttons, rocker switches, thumb-wheel, infrared port, USB port, and/or a pointer device such as a stylus. The one or more buttons (not shown) can include an up/down button for volume control of the speaker 1428 and/or the microphone 1430.

In one implementation, a pressing of the button for a first duration can disengage a lock of the touch surface 1446; and a pressing of the button for a second duration that is longer than the first duration can turn power to the computing device 1400 on or off. Pressing the button for a third duration can activate a voice control, or voice command, module that enables the user to speak commands into the microphone 1430 to cause the device to execute the spoken command. The user can customize a functionality of one or more of the buttons. The touch surface 1446 can, for example, also be used to implement virtual or soft buttons and/or a keyboard.

In some implementations, the computing device 1400 can present recorded audio and/or video files, such as MP3, AAC, and MPEG files. In some implementations, the computing device 1400 can include the functionality of an MP3 player, such as an iPod™.

The memory interface 1402 can be coupled to memory 1450. The memory 1450 can include high-speed random-access memory and/or non-volatile memory, such as one or more magnetic disk storage devices, one or more optical storage devices, and/or flash memory (e.g., NAND, NOR). The memory 1450 can store an operating system 1452, such as Darwin, RTXC, LINUX, UNIX, OS X, WINDOWS, or an embedded operating system such as VxWorks.

The operating system 1452 can include instructions for handling basic system services and for performing hardware dependent tasks. In some implementations, the operating system 1452 can be a kernel (e.g., UNIX kernel). In some implementations, the operating system 1452 can include instructions for performing display buffer alignment. For example, operating system 1452 can implement the display buffer alignment features as described with reference to FIGS. 1-13.

The memory 1450 can also store communication instructions 1454 to facilitate communicating with one or more additional devices, one or more computers and/or one or more servers. The memory 1450 can include graphical user interface instructions 1456 to facilitate graphic user interface processing; sensor processing instructions 1458 to facilitate sensor-related processing and functions; phone instructions 1460 to facilitate phone-related processes and functions; electronic messaging instructions 1462 to facilitate electronic-messaging related processes and functions; web browsing instructions 1464 to facilitate web browsing-related processes and functions; media processing instructions 1466 to facilitate media processing-related processes and functions; GNSS/Navigation instructions 1468 to facilitate GNSS and navigation-related processes and instructions; and/or camera instructions 1470 to facilitate camera-related processes and functions.

The memory 1450 can store software instructions 1472 to facilitate other processes and functions, such as the display buffer alignment processes and functions as described with reference to FIGS. 1-13.

The memory 1450 can also store other software instructions 1474, such as web video instructions to facilitate web video-related processes and functions; and/or web shopping instructions to facilitate web shopping-related processes and functions. In some implementations, the media processing instructions 1466 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1450 can include additional instructions or fewer instructions. Furthermore, various functions of the computing device 1400 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method comprising:
   detecting, by a computing device, movement of a graphical object from a first display buffer corresponding to a first display device to a second display buffer corresponding to a second display device;

determining, by the computing device, a first path corresponding to the movement of the graphical object from a first location in the first display buffer to a second location in the second display buffer;

fitting, by the computing device, a first curve to the first path;

detecting, by the computing device, a discontinuity in a first portion of the first curve that occurs on the second display buffer indicating a correction in the first path that occurs on the second display buffer;

determining, by the computing device, that an error exists in alignment between the first display buffer and the second display buffer based on the detected discontinuity in the first curve; and adjusting, by the computing device, a position of the second display buffer relative to the first display buffer based on the detected discontinuity.

2. The method of claim 1, wherein the discontinuity in the first portion of the first curve is determined by numerically integrating the first curve to examine a derivative of the first curve.

3. The method of claim 1, further comprising:
fitting, by the computing device, a second curve to a second portion of the first path corresponding to the first display buffer;
projecting, by the computing device, the second curve toward the second display buffer; and
adjusting, by the computing device, an alignment of the second display buffer relative to the first display buffer such that the projected curve intersects the second location.

4. The method of claim 3, further comprising:
determining, by the computing device, a second path corresponding to movement of a second graphical object from a third location in the first display buffer to a fourth location in the second display buffer; and
adjusting, by the computing device, the alignment of the second display buffer relative to the first display buffer based on the first path and the second path.

5. The method of claim 3, further comprising:
determining, by the computing device, a third path corresponding to movement of a third graphical object from a fifth location in the second display buffer to a sixth location in the first display buffer; and
adjusting, by the computing device, the alignment of the second display buffer relative to the first display buffer based on the first path and the third path.

6. The method of claim 1, further comprising:
detecting, by the computing device, a new connection to the second display device;
in response to detecting the new connection to the second display device:
generating, by the computing device, the second display buffer corresponding to the second display device,
generating, by the computing device, a prompt in the second display buffer at the second location, and
causing, by the computing device, the prompt to be presented on the second display device;
receiving, by the computing device, user input with respect to the prompt at the second location; and
adjusting, by the computing device, the position of the second display buffer relative to the first display buffer in response to receiving the user input.

7. The method of claim 1, further comprising, responsive to the detected discontinuity reversing the path of the graphical object, horizontally shifting the position of the second display buffer relative to the first display buffer until a projection of an initial path of the graphical object to the destination location intersects with the second location.

8. The method of claim 1, further comprising, responsive to the detected discontinuity altering the path of the graphical object upward or downward, vertically shifting the position of the second display buffer relative to the first display buffer until a projection of an initial path of the graphical object to the destination location intersects with the second location.

9. A non-transitory computer readable medium including a sequence of instructions that, when executed by one or more processors, cause the processors to perform operations comprising:

detecting, by a computing device, movement of a graphical object from a first display buffer corresponding to a first display device to a second display buffer corresponding to a second display device;

determining, by the computing device, a first path corresponding to the movement of the graphical object from a first location in the first display buffer to a second location in the second display buffer;

fitting, by the computing device, a first curve to the first path;

detecting, by the computing device, a discontinuity in a first portion of the first curve that occurs on the second display buffer indicating a correction in the first path that occurs on the second display buffer;

determining, by the computing device, that an error exists in alignment between the first display buffer and the second display buffer based on the detected discontinuity in the first curve; and adjusting, by the computing device, a position of the second display buffer relative to the first display buffer based on the detected discontinuity.

10. The non-transitory computer readable medium of claim 9, wherein the discontinuity in the first portion of the first curve is determined by numerically integrating the first curve to examine a derivative of the first curve.

11. The non-transitory computer readable medium of claim 9, wherein the instructions cause the processors to perform operations comprising:
fitting, by the computing device, a second curve to a second portion of the first path corresponding to the first display buffer;
projecting, by the computing device, the second curve toward the second display buffer; and
adjusting, by the computing device, an alignment of the second display buffer relative to the first display buffer such that the projected curve intersects the second location.

12. The non-transitory computer readable medium of claim 11, wherein the instructions cause the processors to perform operations comprising:
determining, by the computing device, a second path corresponding to movement of a second graphical object from a third location in the first display buffer to a fourth location in the second display buffer; and
adjusting, by the computing device, the alignment of the second display buffer relative to the first display buffer based on the first path and the second path.

13. The non-transitory computer readable medium of claim 11, wherein the instructions cause the processors to perform operations comprising:

determining, by the computing device, a third path corresponding to movement of a third graphical object from a fifth location in the second display buffer to a sixth location in the first display buffer; and adjusting, by the computing device, the alignment of the second display buffer relative to the first display buffer based on the first path and the third path.

14. The non-transitory computer readable medium of claim 9, wherein the instructions cause the processors to perform operations comprising:

detecting, by the computing device, a new connection to the second display device;

in response to detecting the new connection to the second display device:

generating, by the computing device, the second display buffer corresponding to the second display device, generating, by the computing device, a prompt in the second display buffer at the second location, and causing, by the computing device the prompt to be presented on the second display device;

receiving, by the computing device, user input with respect to the prompt at the second location; and adjusting, by the computing device, the position of the second display buffer relative to the first display buffer in response to receiving the user input.

15. A system comprising:

one or more processors; and a non-transitory computer readable medium including a sequence of instructions that, when executed by the one or more processors, cause the processors to perform operations comprising:

detecting, by a computing device, movement of a graphical object from a first display buffer corresponding to a first display device to a second display buffer corresponding to a second display device;

determining, by the computing device, a first path corresponding to the movement of the graphical object from a first location in the first display buffer to a second location in the second display buffer;

fitting, by the computing device, a first curve to the first path;

detecting, by the computing device, a discontinuity in a first portion of the first curve that occurs on the second display buffer indicating a correction in the first path that occurs on the second display buffer;

determining, by the computing device, that an error exists in alignment between the first display buffer and the second display buffer based on the detected discontinuity in the first curve; and adjusting, by the computing device, a position of the second display buffer relative to the first display buffer based on the detected discontinuity.

16. The system of claim 15, wherein the discontinuity in the first portion of the first curve is determined by numerically integrating the first curve to examine a derivative of the first curve.

17. The system of claim 15, wherein the instructions cause the processors to perform operations comprising:

fitting, by the computing device, a second curve to a second portion of the first path corresponding to the first display buffer;

projecting, by the computing device, the second curve toward the second display buffer; and adjusting, by the computing device, an alignment of the second display buffer relative to the first display buffer such that the projected curve intersects the second location.

18. The system of claim 17, wherein the instructions cause the processors to perform operations comprising:

determining, by the computing device, a second path corresponding to movement of a second graphical object from a third location in the first display buffer to a fourth location in the second display buffer; and adjusting, by the computing device, the alignment of the second display buffer relative to the first display buffer based on the first path and the second path.

19. The system of claim 17, wherein the instructions cause the processors to perform operations comprising:

determining, by the computing device, a third path corresponding to movement of a third graphical object from a fifth location in the second display buffer to a sixth location in the first display buffer; and adjusting, by the computing device, the alignment of the second display buffer relative to the first display buffer based on the first path and the third path.

20. The system of claim 15, wherein the instructions cause the processors to perform operations comprising:

detecting, by the computing device, a new connection to the second display device;

in response to detecting the new connection to the second display device:

generating, by the computing device, the second display buffer corresponding to the second display device, generating, by the computing device, a prompt in the second display buffer at the second location, and causing, by the computing device the prompt to be presented on the second display device;

receiving, by the computing device, user input with respect to the prompt at the second location; and adjusting, by the computing device, the position of the second display buffer relative to the first display buffer in response to receiving the user input.

\* \* \* \* \*